United States Patent
Hayakawa et al.

(10) Patent No.: US 7,389,571 B2
(45) Date of Patent: Jun. 24, 2008

(54) RETAINING RING ATTACHING DEVICE AND DATA STORAGE

(75) Inventors: Tatsuo Hayakawa, Kanagawa (JP); Takanori Kawakami, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 157 days.

(21) Appl. No.: 11/141,988

(22) Filed: May 31, 2005

(65) Prior Publication Data

US 2005/0262678 A1 Dec. 1, 2005

(30) Foreign Application Priority Data

May 31, 2004 (JP) ............................. 2004-162472

(51) Int. Cl.
*B23P 19/04* (2006.01)

(52) U.S. Cl. ....................................................... 29/229

(58) Field of Classification Search ................... 29/229, 29/268, 270–278; 269/3, 6
See application file for complete search history.

(56) References Cited

U.S. PATENT DOCUMENTS

| 3,820,773 | A | * | 6/1974 | Aizawa ........................ 269/32 |
| 4,862,572 | A | * | 9/1989 | Jeromson et al. .............. 29/229 |
| 5,933,935 | A | * | 8/1999 | Alcorn ......................... 29/229 |
| 2005/0262678 | A1 | * | 12/2005 | Hayakawa et al. ............. 29/229 |

FOREIGN PATENT DOCUMENTS

| JP | 06-304823 | 11/1994 |
| JP | 10-138054 | 5/1998 |
| JP | 2003-165034 | 6/2003 |

\* cited by examiner

*Primary Examiner*—Lee D Wilson
(74) *Attorney, Agent, or Firm*—Townsend and Townsend and Crew LLP; Duke Amaniampong

(57) ABSTRACT

Embodiments of the invention provide a retaining ring attaching device capable of improving assembling efficiency and a data storage device fabricating method. In one embodiment, a C ring attaching device included in a hard disk drive assembling apparatus expands a C ring, puts the expanded C ring on a pivot, and contracts the C ring on the pivot. The C ring attaching device moves chuck arms holding the C ring such that the C ring is moved so that a gap in the C ring moves away from the pivot while the C ring is being contracted.

8 Claims, 17 Drawing Sheets

(d)

(e)

(f)

(a)

(b)

(c)

(a)

(b)

(a)

(b)

(c)

(a)

(b)

| Dimension "g" | First embodiment | Second embodiment | Third embodiment |
|---|---|---|---|
| | 5.8 mm | 6.5 mm | 6.4 mm |
| Defect Ratio for "Dimple Separation" | Less than 0.1% | 0.3% | 0.6 % (Initial) 0.1 % (After optimization of Chuck motion) |
| Damage on Pivot | Shallow scratch, no protrusion  | Deeper and large dents, large protrusion  | Deep, but small dents, some one has small protrusion  |

RETAINING RING ATTACHING DEVICE AND DATA STORAGE

CROSS-REFERENCES TO RELATED APPLICATIONS

This application claims priority from Japanese Patent Application No. JP2004-162472, filed May 31, 2004, the entire disclosure of which is incorporated herein by reference.

BACKGROUND OF THE INVENTION

The present invention relates to a retaining ring attaching device and a data storage device fabricating method.

There are various known data storage devices using various recording mediums, such as optical disks and magnetic tapes. A hard disk drive is used prevalently as a storage device for computers and is one of indispensable storage devices for current computer systems. Uses of the hard disk drive as removable storage devices for motion image storage/reproduction devices, car navigation systems and digital cameras are progressively increasing owing to the excellent characteristics of the hard disk drive.

Internal contamination of products using a hard disk, such as hard disk drives, with metal powder is extremely detrimental to those products. Accordingly, there is a tendency to avoid using retaining rings (hereinafter, referred to as "C ring(s)") for assembling a hard disk drive because C rings come into sliding contact with metal members.

Reduction of the cost of the data storage device is an urgent need in recent years and demands a data storage device of simple construction capable of being assembled with reliability, and an assembling method of assembling the data storage device. The conventional hard disk drive is provided with a head stack assembly (hereinafter, abbreviated to "HSA") fixedly mounted on a pivot. A slide screw fixing method has been used for fixedly mounting the HSA on the pivot. However, a fixing method that uses a C ring for fixing the HAS to the pivot is used to achieve cost reduction. FIG. 20 shows a HSA assembled by the fixing method using a C ring in a perspective view.

Referring to FIG. 20, a pivot 903 is fitted in a hole 902 formed in a HSA 901 such that the HSA 901 is seated on a flange 904 formed in the pivot 903. A wavy washer 905 is put on the HSA 901, and a C ring 906 is attached to the pivot 903 so as to retain the HSA 901 and the wavy washer 905 on the pivot 903. The HSA 901 is held between the flange 904 and the wavy washer 905 and is held fixedly on the pivot 903 by the resilience of the wavy washer 905. Generally, the C ring 906 is attached to the pivot 903 by a manual operation using a hand tool, such as a pair of pliers.

A C ring attaching device disclosed in Japanese Patent Laid-open JP-A 10-138054 (Patent Document 1) inserts pins in small holes formed at the opposite ends of a C ring, moves the pins away from each other to expand the C ring, and fits the C ring in an annular groove formed in a shaft. This C ring attaching device is capable of forcibly reducing the diameter of the C ring if necessary in attaching the C ring to the shaft. A C ring attaching device disclosed in Japanese Patent Laid-open JP-A 6-304823 (Patent Document 2) is capable of automatically attaching a C ring to a shaft. These two references mention nothing about the application of the C ring attaching devices to attaching a C ring to a shaft in assembling a hard disk drive.

BRIEF SUMMARY OF THE INVENTION

The conventional hard disk drive assembling method is unable to assemble a hard disk drive efficiently because a C ring needs to be attached to a shaft by an operator.

The present invention has been made in view of the foregoing circumstances and it is therefore a feature of the present invention to provide a retaining ring attaching device capable of efficiently attaching a retaining ring to a shaft, and to provide a data storage device fabricating method.

A retaining ring attaching device in a first aspect of the present invention for attaching a retaining ring having an opening to a shaft includes: chucking arms for expanding the retaining ring, putting the retaining ring on the shaft and contracting the retaining ring; and a chucking arm moving mechanism for moving the chuck arms holding the retaining ring so as to move the retaining ring in a first direction in which a gap in the retaining ring moves away from the shaft while the retaining ring is contracting on the shaft.

The retaining ring attaching device is used for automatically and efficiently assembling a data storage device. Since the retaining ring is contracted while the open end of the retaining ring is shifted away from the shaft, the possibility of the shaft being flawed by the retaining ring can be decreased.

Preferably, the chucking arm moving mechanism includes: sliders capable of sliding in a second direction in which the retaining ring expands; and a guide mechanism capable of sliding the chucking arms in a third direction inclined to the second direction toward the first direction so that the chucking arms move toward each other, pushing the retaining ring in the first direction.

The retaining ring attaching device according to an embodiment of the present invention further includes: a motor having a rotating shaft; an eccentric cam having an inner eccentric cam and an outer eccentric cam, and fixedly mounted on the rotating shaft of the motor; and cam followers connected to the sliders so as to move along the inner eccentric cam or the outer eccentric cam to slide the sliders. The retaining ring attaching device further includes slider springs movably connecting the sliders and the cam followers.

The guide mechanism has an arm cam fixed to the chuck arm, and a guide block having an inclined surface, and fixed to the slider with the inclined surface inclined in the third direction and in contact with the arm cam.

A retaining ring attaching device in a second aspect of the present invention includes: sliders capable of sliding in a direction in which a retaining ring having a gap expands; chucking arms fixed to the sliders, capable of sliding in the direction in which the retaining ring expands as the sliders slide and of putting the retaining ring on a shaft inserted in the retaining ring; a motor having a rotating shaft; an eccentric cam having an inner eccentric cam and an outer eccentric cam and fixedly mounted on the rotating shaft for rotation together with the rotating shaft; and cam followers connected to the sliders so as to move along the inner eccentric cam or the outer eccentric cam to slide the slider. The retaining ring attaching device is used for automatically and efficiently assembling a data storage device.

A retaining ring attaching device in a third aspect of the present invention includes: first and second sliders disposed opposite to each other and capable of moving in opposite directions; a first chuck arm to be connected to a first end of a retaining ring having a gap, connected to the first slider, and capable of moving in the opposite directions as the first slider slides; a second chuck arm to be connected to a second end of the retaining ring opposite the first end, connected to the second slider, and capable of sliding in the opposite directions as the second slider slides to expand the retaining ring in cooperation with the first chuck arm so that the retaining ring is attached to a shaft; and a guide mechanism for guiding the first and the second chuck arm for sliding in a direction inclined to the opposite directions toward an outward direction from the center of the retaining ring toward the gap of the retaining ring so that the first and the second chuck arm permit the retaining ring to contract by pressing the retaining ring in the outward direction.

A data storage device can be automatically and efficiently assembled by using the retaining ring attaching device. Since the retaining ring contracts as the open ends of the retaining ring is separated from the shaft, the possibility of the shaft being flawed by the retaining ring can be decreased.

The retaining ring attaching device according to an embodiment of the present invention further includes: a motor having a rotating shaft; an eccentric cam having an inner eccentric cam and an outer eccentric cam and fixedly mounted on the rotating shaft; a first cam follower that moves along the inner or the outer eccentric cam to slide the first slider; a second cam follower that moves along the inner or the outer eccentric cam to slide the second slider in coordination with the first slider; a first slider spring movably connecting the first slider and the first cam follower; a second slider spring movably connecting the second slider and the second cam follower; and a cam follower spring having a spring constant lower than those of the first and the second slider spring and movably connecting the first and the second cam follower.

The guide mechanism includes a first guide mechanism capable of coming into contact with the first chuck arm in an inclined plane inclined in the outward direction to the opposite directions to guide the first chuck arm along the inclined plane so that the retaining ring is pushed, and a second guide mechanism interlocked with the first chuck arm and capable of guiding the second chuck arm so as to push the retaining ring.

The second guide mechanism includes: an arm spring movably connecting the first chuck arm and the second chuck arm; and an arm cam fixed to the second chuck arm, and holding the first chuck arm together with the first guide mechanism to operate the second chuck arm substantially symmetrically with the first chuck arm with respect to an axis substantially perpendicular to a line connecting the first and the second end.

The first guide mechanism is substantially a mechanism that inclines and slides the first and the second chuck arm. Therefore, the first and the second chuck arm can be inclined and slid without excessively increasing parts for inclining and sliding the first and the second chuck arm.

A data storage device fabricating method in a fourth aspect of the present invention includes the steps of: mounting a head stack assembly on a pivot; expanding a retaining ring; putting the expanded retaining spring on the pivot; and contracting the retaining ring while the retaining ring put on the pivot is pushed to attach the retaining ring to the pivot. The data storage device fabricating method can automatically and efficiently assemble a data storage device. Since the retaining ring is contracted while the same is being pushed, the possibility of the pivot being flawed by the retaining ring can be decreased.

A data storage device assembling method in a fifth aspect of the present invention includes the steps of: mounting a head stack assembly on a pivot; expanding a retaining ring; putting the expanded retaining ring on the pivot; attaching the retaining ring to the pivot by contracting the retaining ring; re-expanding the retaining ring; and contracting the re-expanded retaining ring. The data storage device fabricating method can automatically and efficiently assemble a data storage device.

The retaining ring attaching device of the present invention enables efficient assembling work, and the data storage device fabricating method is capable of efficiently assembling a data storage device.

DETAILED DESCRIPTION OF THE INVENTION

Specific embodiments of the present invention will be described with reference to the accompanying drawings. The present invention will be described as applied to a hard disk drive in an example of a data storage device.

First Embodiment

Figure 1:
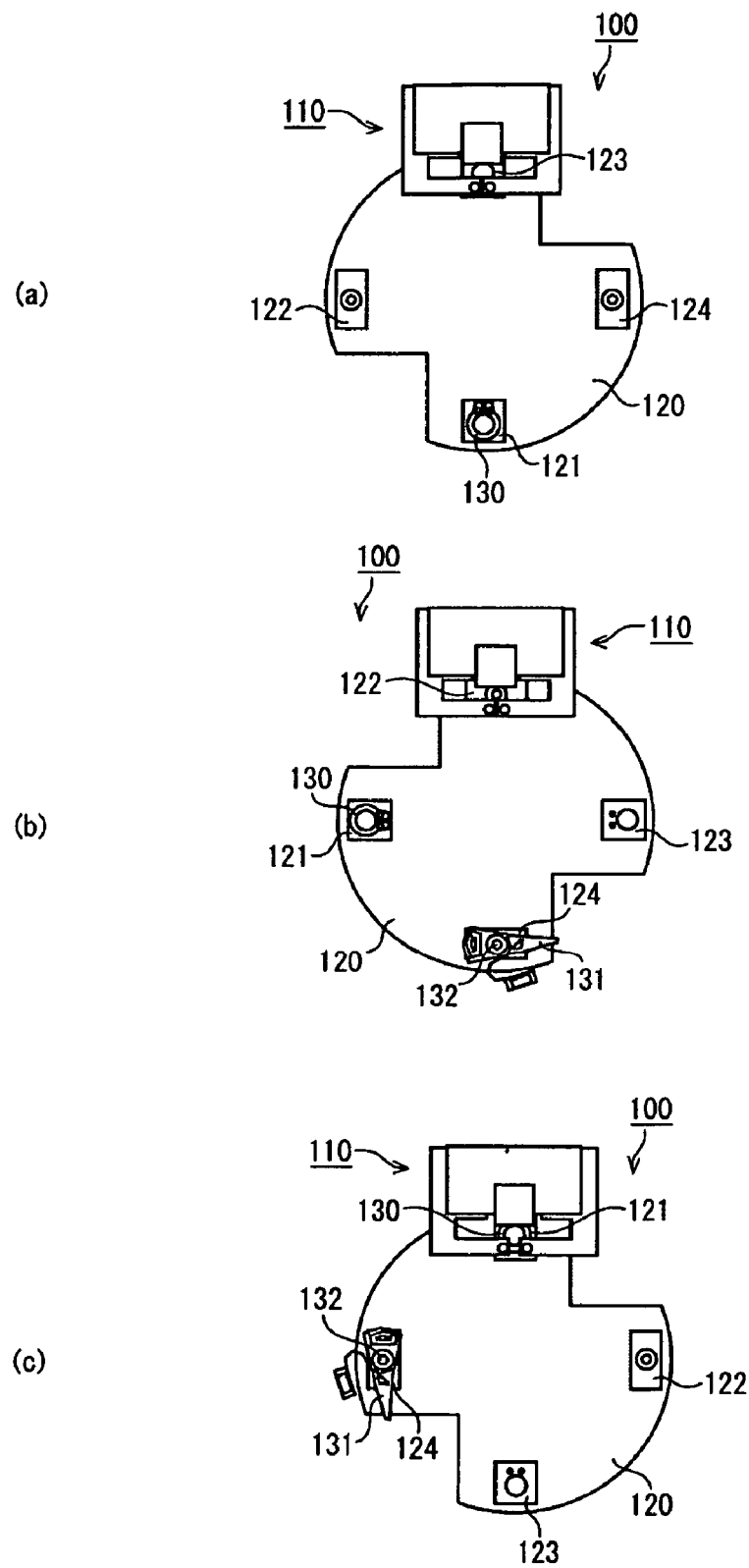
FIG. 1 is a schematic, typical view of assistance in explaining a hard disk drive assembling operation to be carried out by an assembling apparatus according to embodiments of the present invention.
Figure 2:
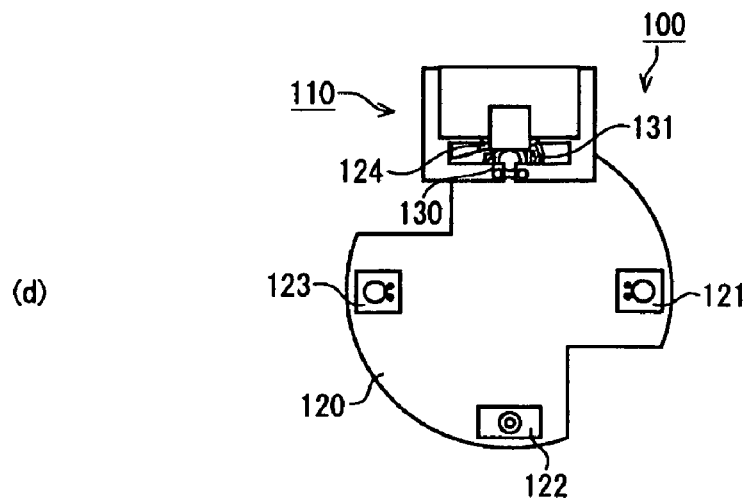
FIG. 2 is a schematic, typical view of assistance in explaining the hard disk drive assembling operation to be carried out by the assembling apparatus according to embodiments of the present invention.
Figure 2:
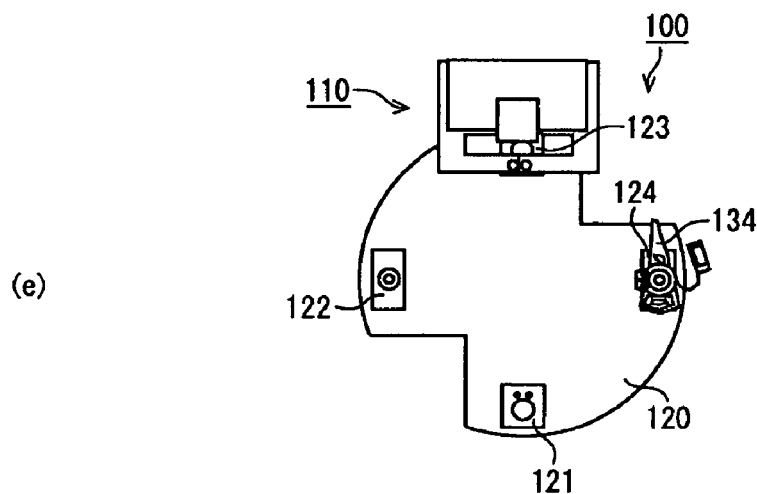
Figure 2:
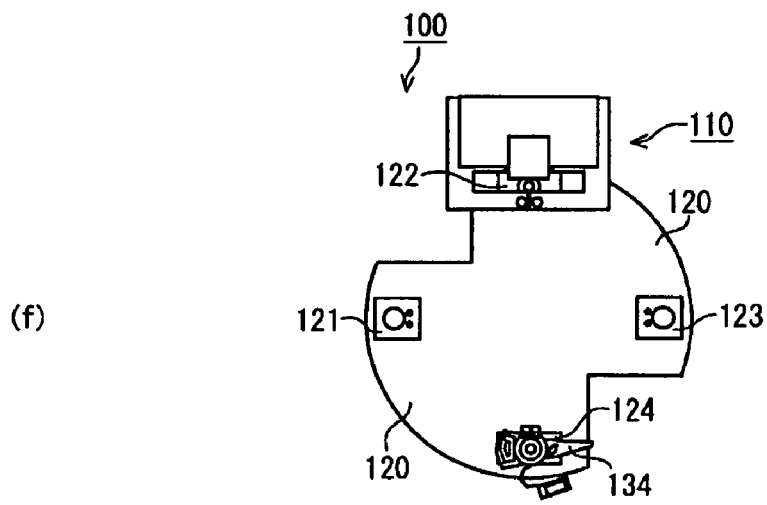

A hard disk drive assembling apparatus relating to an embodiment of the present invention will be described with reference to FIGS. 1 and 2 showing steps of hard disk drive assembling operation to be carried out by the hard disk drive assembling apparatus in typical views.

Referring to FIG. 1(a), a hard disk drive assembling apparatus 100 embodying the present invention has a C ring attaching device 110 in a first embodiment according to the present invention and an index table 120. In the following description, the hard disk drive assembling apparatus 100 will be referred to simply as the assembling apparatus 100.

The C ring attaching device 110 serves as a pair of pliers for expanding and contracting a C ring. The index table 120 is a turntable that turns in a substantially horizontal plane. The C ring attaching device 110 is fixedly disposed near an inner part of the index table 120. The index table 120 is fixedly provided with fixtures 121, 122, 123 and 124. The fixtures 121 to 124 turn together with the index table 120.

A C ring attaching operation of the assembling apparatus 100 will be described. As shown in FIG. 1(a), a C ring 130 is placed on the fixture 121 of the index table 120. For example, the C ring 130 is carried by and positioned relative to the fixture 121 by a robot arm, not shown.

As shown in FIG. 1(b), the index table 120 turns after the C ring 130 has been placed on the fixture 121. The index table 120 stops after turning clockwise, as viewed in FIG. 1, through an angle of about 90°. Then, a robot arm, not shown, places a HSA 131 on the fixture 124 after the index table 120 has stopped.

As shown in FIG. 1(c), the index table 120 fixedly holding the C ring 130 and the HSA 131 thereon turns through an angle of about 90°. At this stage, the fixture 121 is positioned at a back part of the index table 120 such that the C ring 130 is positioned so as to correspond to the C ring attaching device 110. The C ring attaching device 110 takes up the C ring 130 from the fixture 121.

As shown in FIG. 2(d), the index table 120 turns through an angle of about 90° after the C ring attaching device 110 has held the C ring 130. At this stage, the HSA 131 held by the fixture 124 is moved to a back part of the index table 120 so as to correspond to the C ring attaching device 110. The C ring attaching device 110 attaches the C ring 130 to a pivot 132. An operation for attaching the C ring 130 to the pivot 132 will be described later.

As shown in FIG. 2(e), the index table 120 turns clockwise through an angle of about 90° after the C ring 131 has been attached to the pivot 132. Thus the HSA 131 is separated from the C ring attaching device 110 to enable an assembly 133 of the HSA 131, and the pivot 132 and the C ring 130 can be removed from the index table 120. Then, as shown in FIG. 2(f), the index table 120 turns further through an angle of about 90° to position the assembly 133 at a removing position where a robot arm, not shown, takes up the assembly 133 from the index table 120. The C ring attaching operation illustrated by FIGS. 2(a) to 2(f) uses the fixtures 121 and 124. Another assembly 133 can be assembled simultaneously with the assembly 133 assembled by using the fixtures 121 and 124 by using the fixtures 122 and 123.

The assembling apparatus 100 is capable of attaching the C ring 130 to the pivot 132. The assembling apparatus 100 has three working stations, and turns the index table 120 through an angle of about 90° at a time to locate the parts at the working stations. The assembling apparatus 100 assembles one assembly 133 every turn of the index table 120 through an angle of about 180°. The assembling apparatus 100 performs assembling operations simultaneously at the three working stations to reduce time.

Figure 3:
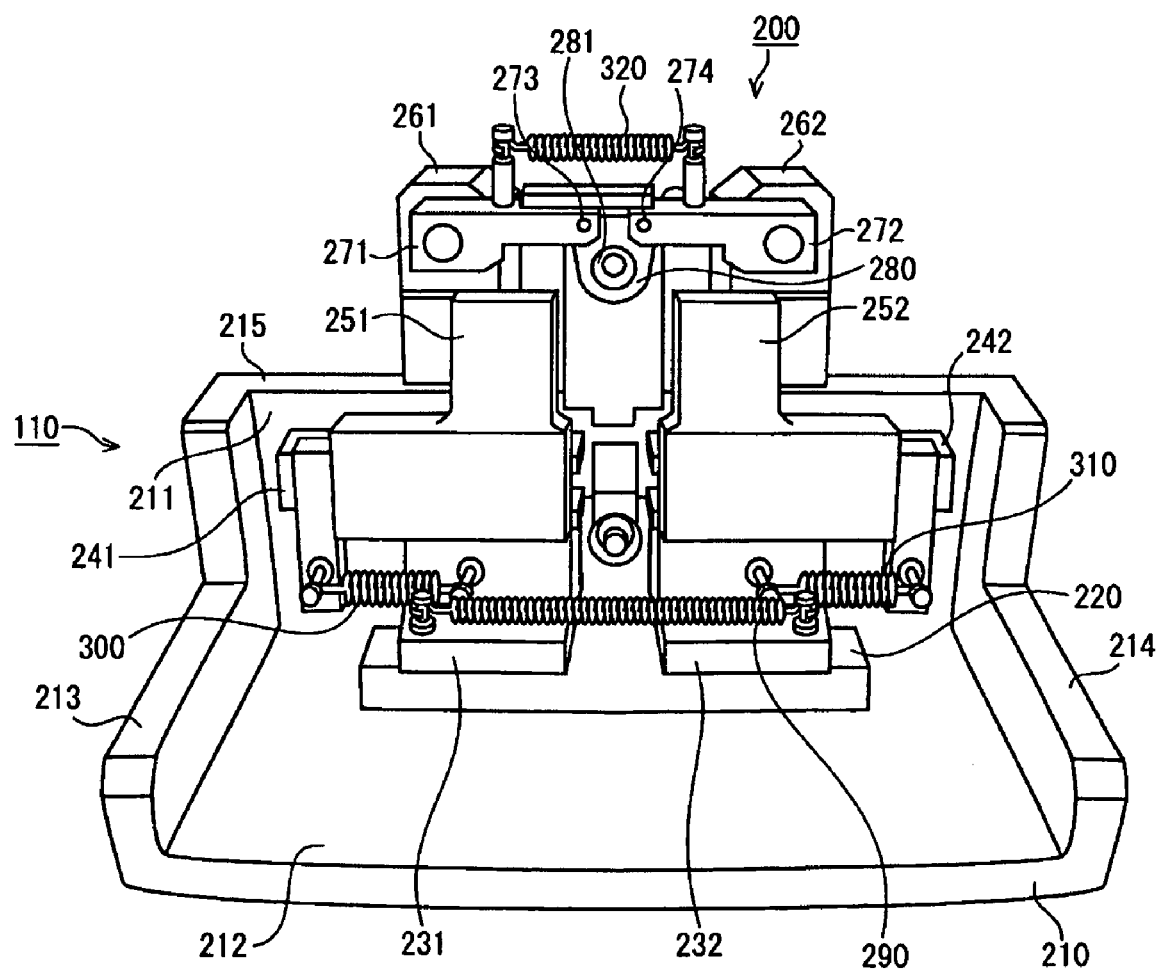
FIG. 3 is a perspective view of a C ring attaching device in a first embodiment according to the present invention.

The construction of the C ring attaching device 110 in the first embodiment of the present invention will be described with reference to FIGS. 3 to 5. FIG. 3 shows a pick-up mechanism included in the C ring attaching device 110 for taking up the C ring 130 in a bottom view. FIG. 3 is a view of the C ring attaching device 110 taken from below the C ring attaching device 110 fixed relative to the index table 120. In FIG. 3, a side on the side of the front surface of the paper is an upper side, a side on the side of the back surface of the paper is a lower side, a side on the side of an upper part of the paper is a front side, and a side on the side of a lower part of the paper is a back side.

Referring to FIG. 3, the C ring attaching device 110 is provided with a pick-up mechanism 200. The pick-up mechanism 200 includes a base plate 210, a back slide rail 220, cam followers 231 and 232, upper slide rails 241 and 242, back slide rails 251 and 252, front sliders 261 and 262, chuck arms 271 and 272, a C ring guide 280, a cam follower spring 290, slider springs 300 and 310, and arm spring 320.

The component members of the C ring attaching device 110 are mounted on the base plate 210. The base plate 210 is fixedly disposed relative to the index table 120. The base plate 210 has an upper wall 211, a back wall 212 and sidewalls 213 and 214. The C ring attaching device 110 is fixedly installed with the upper wall 211 held substantially horizontally. The upper wall 211 is substantially perpendicular to the back wall 212 and the sidewalls 213 and 214. The back wall 212 and the side walls 213 and 214 are held substantially vertically when the C ring attaching device 110 is fixedly installed.

The back slide rail 220 is an elongate member having the shape of a strip. The back slide rail 220 is fixed to the back wall 212 so as to extend substantially parallel to the upper wall 211 of the base plate 210.

The cam followers 231 and 232 are substantially L shaped members. The cam followers 231 and 232 are mounted on the base plate 210 such that one of the legs of each of the cam followers 231 and 232 is slidable along the back wall 212 of the base plate 210 and the other leg is slidable along the upper wall 211 of the base plate 210. Sides, on the side of the upper wall 211, of the cam followers 231 and 232 are engaged with an eccentric cam, not shown in FIG. 3. The cam followers 231 and 232 are symmetrical with respect to a centerline.

The upper slide rails are elongate members substantially resembling a strip. The upper side rails 241 and 242 are fixed to the upper wall 211 so as to extend substantially parallel to the back wall 212 of the base plate 210. The upper slide rails 241 and 242 are substantially aligned with a straight line.

The back sliders 251 and 252 are mounted on the upper slide rails 241 and 242 so as to move straight. The back sliders 251 and 252 are able to slide substantially parallel to the back wall 212 of the base plate 210. The back sliders 251 and 252 are substantially symmetric with respect to the center line.

The front sliders 261 and 262 are connected to the back sliders 251 and 252, respectively. The front sliders 261 and 262 are mounted on the end surface 215 of the back wall 212 of the base plate 210 for sliding along the end surface 215. The front sliders 261 and 262, similarly to the back sliders 251 and 252, are substantially symmetric with respect to the center line.

The chuck arms 271 and 272 are supported for turning on the front sliders 261 and 262, respectively. More specifically, the chuck arms 271 and 272 are supported on end parts of the front sliders 261 and 262, respectively. The chuck arms 271 and 272 are substantially symmetric with respect to the centerline. The chuck arms 271 and 272 extend toward each other. The chuck arms 271 and 272 are provided with chuck pins 273 and 274, respectively. The chuck pins 273 and 274 are attached to end parts of the chuck arms 271 and 272 so as to project downward.

The C ring guide 280 positions the C ring 130. The C ring guide 280 is fixed to the upper wall 211 of the base plate 210 at a position between the extremities of the chuck arms 271 and 272. The C ring guide 280 is provided with a C-shaped groove 281 resembling the shape of the C ring 130. The C ring guide 280 is fixed to the upper wall 211 such that the C-shaped groove 281 is substantially horizontal.

The cam follower spring 290 has opposite ends attached to the cam followers 231 and 232. More concretely, the cam follower spring 290 is extended between the legs of the L-shaped cam followers 231 and 232 on the back wall 212.

The respective spring constants of the slider springs 300 and 310 are greater than that of the cam follower spring 290. The slider spring 300 has opposite ends attached to the back slider 251 and the cam follower 231. More concretely, the slide spring 300 is attached to the leg of the substantially L-shaped cam follower 231 on the upper wall 211. The slider spring 300 extends substantially parallel to the upper wall 211 of the base plate 210. The slider spring 311, similarly to the slider spring 300, has opposite ends attached to the cam follower 232 and the back slider 252. The arm spring 320 is extended between the chuck arms 271 and 272.

Figure 4:
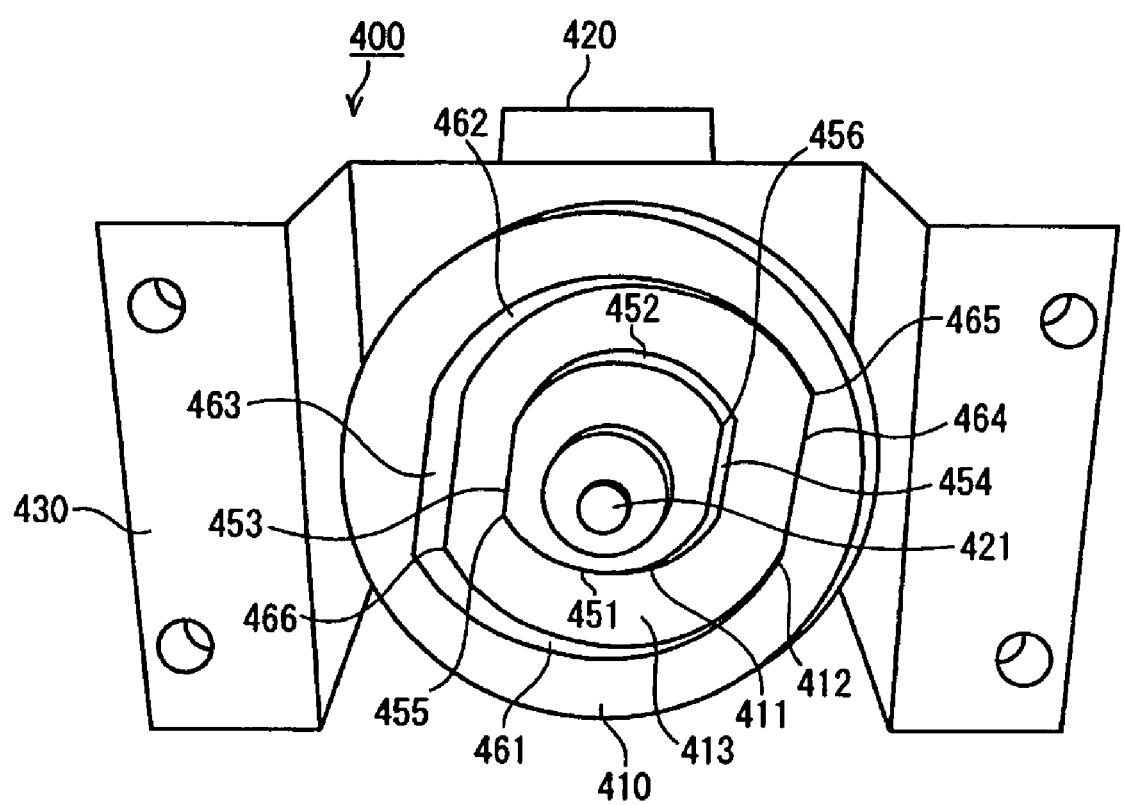
FIG. 4 is a perspective view of the C ring attaching device in the first embodiment.

FIG. 4 shows a driving mechanism for operating the chuck arms 271 and 272 of the C ring attaching device 110 in a bottom view. FIG. 4, similarly to FIG. 3, is a bottom view taken from below the C ring attaching device 110 fixedly disposed relative to the index table 120. In FIG. 4, a side on the side of the front surface of the paper is an upper side, a side on the side of the back surface of the paper is a lower side, a side on the side of an upper part of the paper is a front side, and a side on the side of a lower part of the paper is a back side. As shown in FIG. 4, the C ring attaching device 110 is provided with a driving mechanism 400 in addition to the members 210 to 320. The driving mechanism 400 includes an eccentric cam 410, a motor 420 and a cam base plate 430.

The eccentric cam 410 is a grooved cam having a substantially circular shape on a plane. The eccentric cam 410 has an inner eccentric cam 411 and an outer eccentric cam 412 spaced apart from each other by a cam groove 413. The inner and the outer side surface of the cam groove 413 are the cam surfaces of the inner eccentric cam 411 and the outer eccentric cam 412, respectively.

The inner eccentric cam 411 consists of two eccentric curved sections 451 and 452, and two flat sections 453 and 454. As shown in FIG. 4, the curved sections 451 and 452 and the flat sections 453 and 454 are connected successively and are substantially symmetric with respect to the center of the eccentric cam 410. Each of the curved sections 451 and 452 has opposite ends connected to the flat sections 453 and 454. A corner 455 is formed at the joint of the curved section 451 and the flat section 453, and a corner 456 is formed at the joint of the curved section 452 and the flat section 454. The incenter of a circle inscribed in the curved sections 451 and 452 and the incenter of a circle inscribed in the flat sections 453 and 454 are at different positions, respectively.

The outer eccentric cam 412, similarly to the inner eccentric cam 411, consists of two eccentric curved sections 461 and 462, and two flat sections 463 and 464. The curved sections 461 and 462 and the flat sections 463 and 464 are arranged alternately and are substantially symmetric with respect to the center of the eccentric cam 410. Corners 466 and 465 are formed at the joint of the curved section 461 and the flat section 463, and the joint of the curved section 462 and the flat section 464, respectively.

The curved sections 461 and 462 of the outer eccentric cam 412 face the curved sections 451 and 452 of the inner eccentric cam 411, respectively, with the cam groove 413 disposed therebetween. The curved sections 461 and 462 are substantially similar to the curved sections 451 and 452. The flat sections 463 and 464 face the flat sections 453 and 454 of the inner eccentric cam 411, respectively, with the cam groove 413 disposed therebetween.

The outer eccentric cam 412 is greater than the inner eccentric cam 411 and has a shape substantially similar to that of the inner eccentric cam 411. The outer eccentric cam 412 having the two curved sections 461 and 462 and the flat sections 463 and 464 serves as an eccentric cam surface. Since the sections 461 to 464 of the outer cam surface face the sections 451 to 454 of the inner eccentric cam 411, respectively, the respective centers of the inner eccentric cam 411 and the outer eccentric cam 412 are at substantially the same position.

The motor 420 is an electric motor, such as a stepper motor. The motor 420 has a drive shaft 421 connected to a central part of the inner eccentric cam 411 perpendicularly to the inner eccentric cam 411. The cam base plate 430 supports the drive shaft 421 of the motor 420 connected to the eccentric cam 410. The cam base plate 430 supports the eccentric cam 410 on the base plate 210. The eccentric cam 410 is supported substantially parallel to the upper wall 211 of the base plate 210 by the cam base plate 430. The cam base plate 430 is fixed to the upper surface of the upper wall 211 of the base plate 210. The eccentric cam 410 is supported on a side of the upper wall 211 of the base plate opposite a side on which the members of the pick-up mechanism 200 are disposed.

In this driving mechanism 400, the eccentric cam 410 guides the cam followers 231 and 232 by both the inner eccentric cam 411 and the outer eccentric cam 412. The chuck arms 271 and 272 can be opened and closed by the motor 420.

Figure 5:
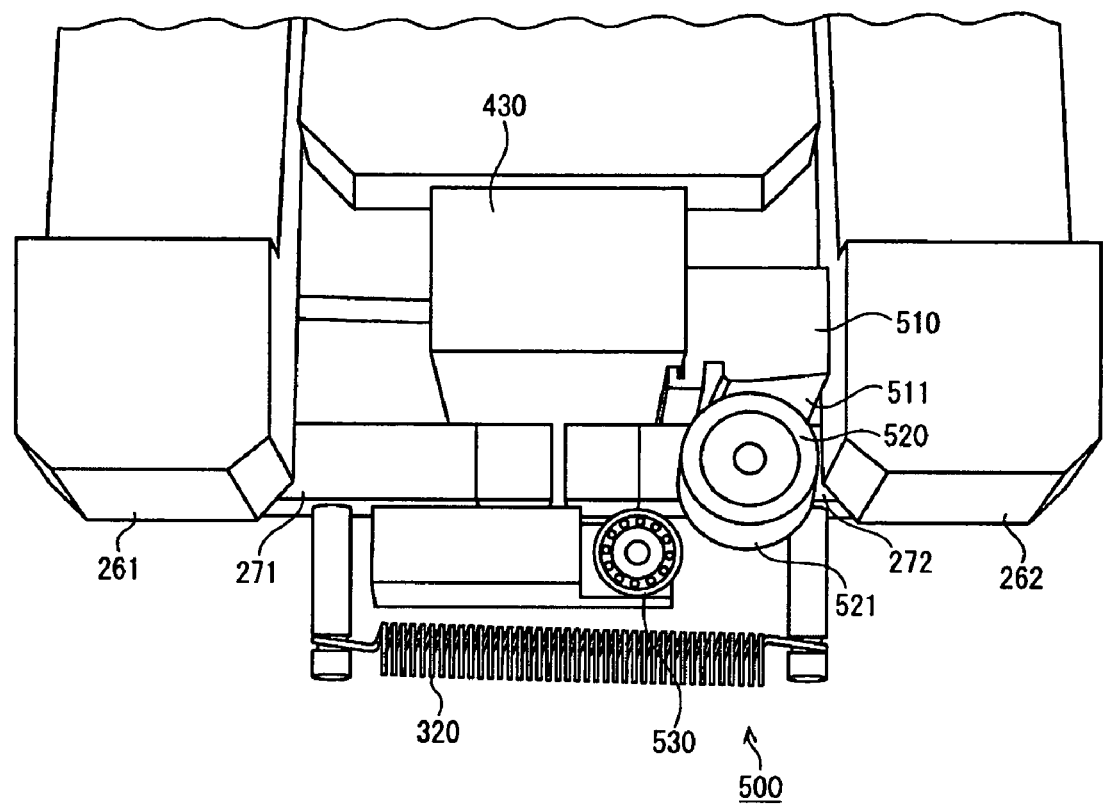
FIG. 5 is a perspective view of the C ring attaching device in the first embodiment.

FIG. 5 shows an arm guide mechanism 500 included in the C ring attaching device 110 in a top view. The arm guide mechanism 500 guides the chuck arms 271 and 272. FIG. 5 is a top view of the C ring attaching device 110 fixedly disposed relative to the index table 120. In FIG. 5, a side on the side of the front surface of the paper is a front side, a side on the side of the back surface of the paper is a back side, a side on the side of an upper part of the paper is an upper side, and a side on the side of a lower part of the paper is a lower side. As shown in FIG. 5, the C ring attaching device 110 further includes the arm guide mechanism 500 having a guide block 510 and arm cams 520 and 530.

The guide block 510 has an inclined surface 511. The guide block 510 is fixed to the cam base plate 430 with the inclined surface 511 facing the chuck arm 272. The inclined surface 511 is substantially vertical and is inclined to the upper wall 211 of the base plate 210. The inclined surface 511 is inclined to the length of the chuck arm 272; that is, the inclined surface 511 is inclined to a direction in which the front sliders 261 and 262 slide. The arm cam 520 is a drum cam and is fastened to the chuck arm 272. The arm cam 520 has a side surface 521 in contact with the inclined surface 511. The arm cam 520 slides along the inclined surface 511. The arm cam 530 is fixed to the chuck arm 271 so as to be in contact with the front surface of the chuck arm 272.

In this arm guide mechanism 500, the chuck arm 272 lies between the guide block 510 and the arm cam 530. The chuck arms 271 and 272 are forced to extend toward each other by the arm spring 320 extended between the chuck arms 271 and 272. Thus the respective motions of the chuck arms 271 and 272 are substantially symmetric. When the arm cam 520 attached to the chuck arm 272 slides along the inclined surface 511, the chuck arm 271 moves and inclined similarly to the chuck arm 272.

A C ring attaching operation to be carried out by the C ring attaching device 110 will be described with reference to FIGS. 6 to 8. The C ring attaching operation will be described principally in connection with FIG. 6 and reference will be made to FIGS. 7 and 8 when necessary.

Figure 6:
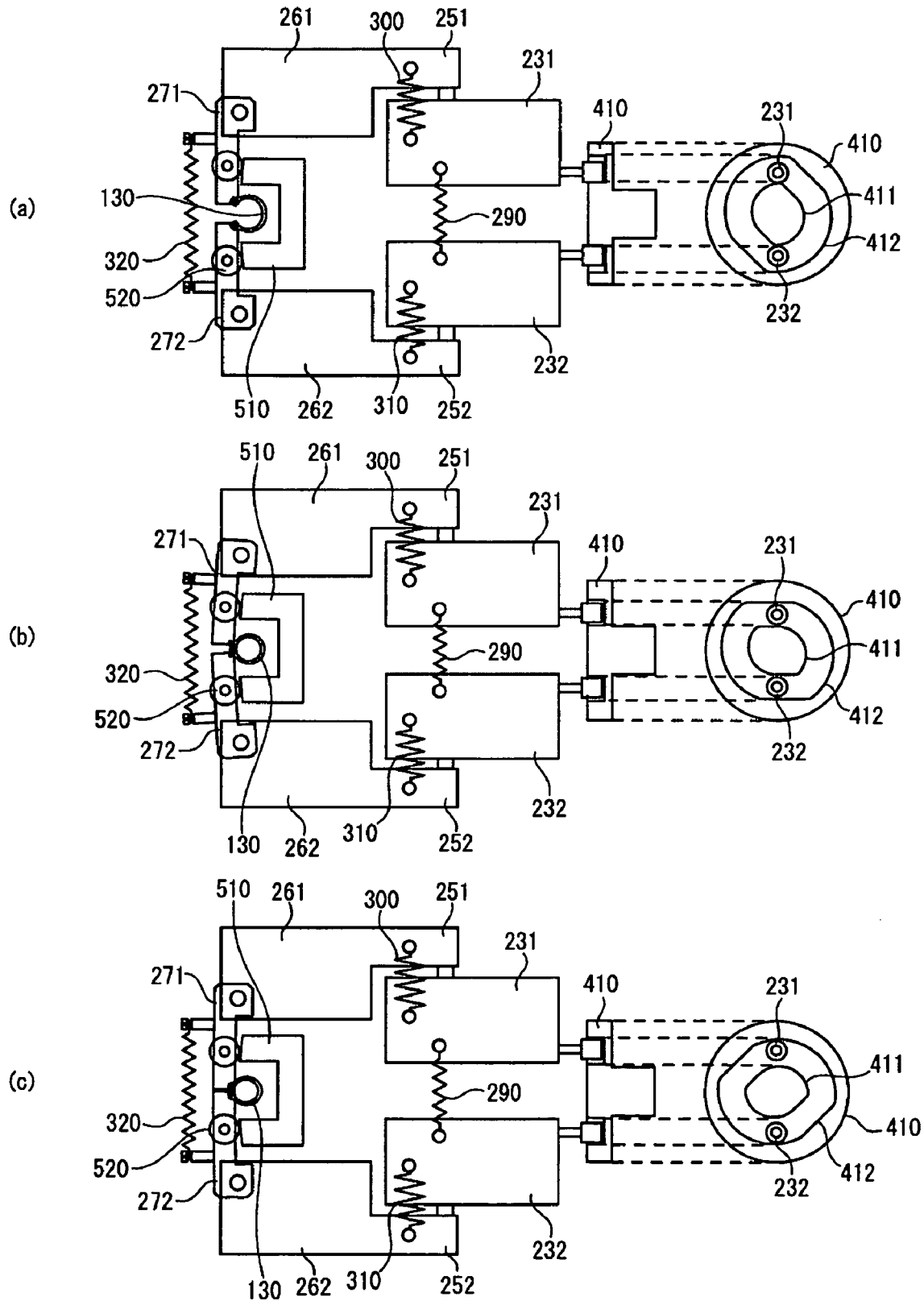
FIG. 6 is a schematic, typical view of assistance in explaining a C ring attaching operation to be carried out by the C ring attaching device according to an embodiment of the present invention.

FIG. 6 illustrates the general operation of the C ring attaching device 110 in a schematic view. In FIG. 6, two guide blocks 510 and two arm cams 520 are shown hypothetically to facilitate understanding the operation of the chuck arms 271 and 272.

As shown in FIG. 6(a), the cam followers 231 and 232 are in contact with the inner eccentric cam 411 of the eccentric cam 410 when the chuck arms 271 and 272 are opened. The cam followers 231 and 232 slides along the back slide rail 220 so as to separate from each other when the eccentric cam 410 turns.

Since the back sliders 251 and 252 are connected to the cam followers 231 and 232 by the slider springs 300 and 310, respectively, the back sliders 251 and 252 slide on the upper slide rails 241 and 242 so as to separate from each other. The strong slider springs 300 and 310 are not stretched, and the weak cam follower spring 290 for removing the back lash is stretched.

The front sliders 261 and 262 fixed respectively to the back sliders 251 and 252 slide along the end surface 215 of the base plate 210 according to the sliding of the back sliders 251 and 252. Consequently, the chuck arms 271 and 272 are moved apart from each other, and the distance between the chuck pins 273 and 274 is increased. Upon engagement of the cam followers 231 and 232 with the corners 455 and 456 of the inner eccentric cam 411, the distance between the chuck pins 273 and 274 of the chuck arms 271 and 272 increases to the maximum. The chuck arms 271 and 272 press the C ring 130 against a wavy washer, not shown, and put the C ring 130 on the pivot 132.

Figure 7:
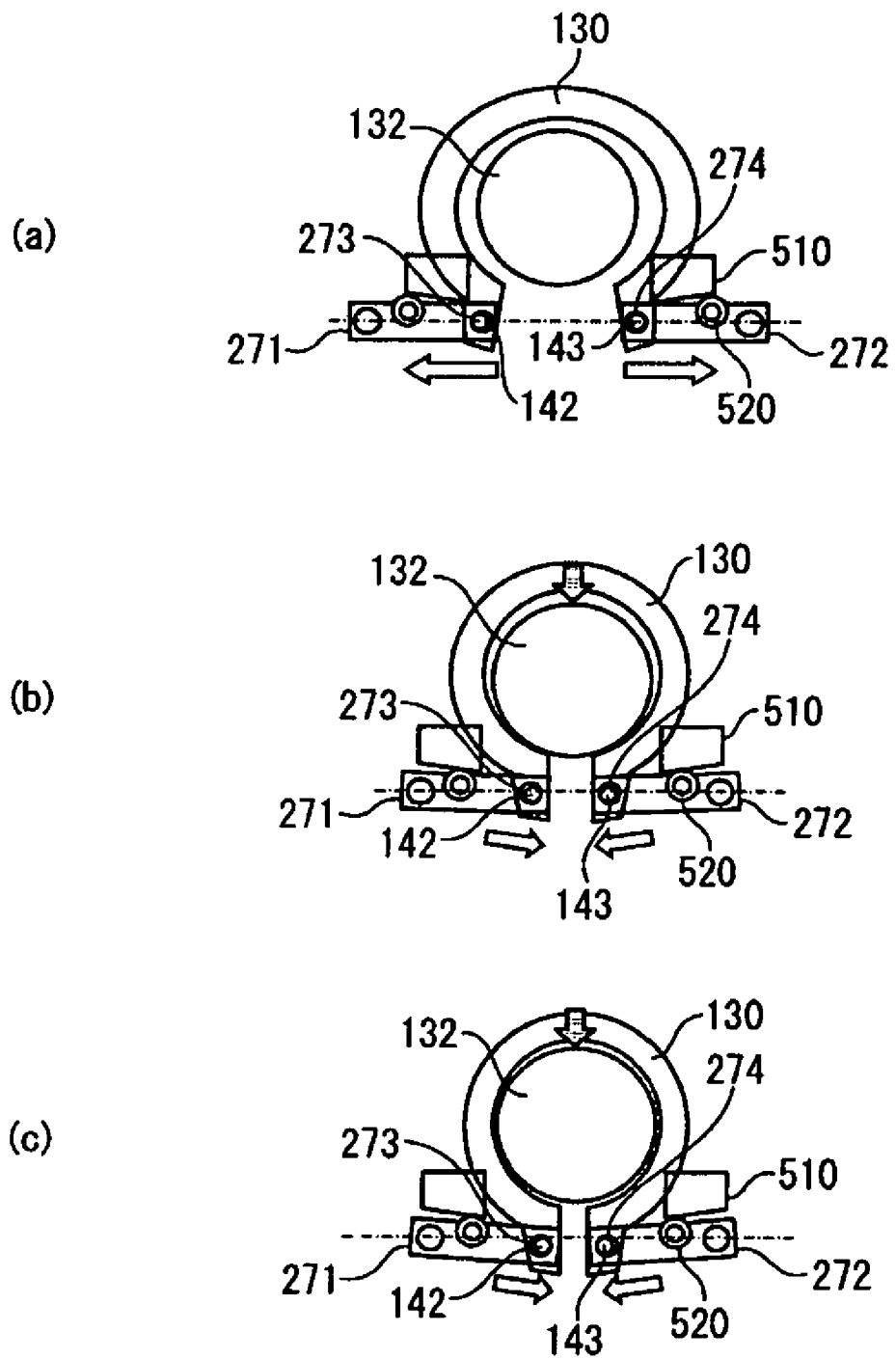
FIG. 7 is a schematic, typical view of assistance in explaining the C ring attaching operation to be carried out by the C ring attaching device according to an embodiment of the present invention.

FIG. 7(a) shows the C ring 130 put on the pivot 132 in a typical view. The arm guide mechanism 500 shown in FIG. 5 has the single guide block 510 that slides the chuck arms 271 and 272 in an inclined position. FIG. 7, similarly to FIG. 6, shows hypothetically two guide blocks 510 and two arm cams 520 to facilitate understanding the operation of the chuck arms 271 and 272.

As shown in FIG. 7(a), the C ring 130 has a gap 141 (see FIG. 8) and chuck holes 142 and 143. The gap 141 is formed between the opposite ends 144 and 145 of the substantially annular C ring 130. The chuck holes 142 and 143 are through holes formed in the ends 144 and 145, respectively.

When the chuck arms 271 and 272 take up the C ring 130, the C ring 130 is fitted in the C-shaped groove 281 of the C ring guide 280. In this state, the chuck pins 273 and 274 are fitted in the chuck holes 142 and 143 of the C ring 130. The chuck arms 271 and 272 are moved to engage the chuck pins 273 and 274 with the side surfaces of the chuck holes 142 and 143, respectively, and expand the gap 141. The chuck arms 271 and 272 slide without inclining in the vicinity of parts of the guide blocks 510 near the side ends of the chuck arms 271 and 272; that is, the chuck arms 271 and 272 move straight in directions (lateral directions) in which the front sliders 261 and 262 slide.

Referring to FIG. 6(b), the motor 420 continues to operate in the state shown in FIG. 6(a) and then the cam followers 231 and 232 in engagement with the inner eccentric cam 411 are disengaged gradually from the inner eccentric cam 411. As the cam followers 231 and 232 are disengaged from the inner eccentric cam 411, the stretched, weak cam follower spring 290 contracts. The strong slider springs 300 and 310 remain unstretched. The operations of the cam followers 231 and 232 and the chuck arms 271 and 272 are coordinated.

FIG. 7(b) shows the C ring 130 in this state in a typical view. The separated chuck arms 271 and 272 are moved toward each other. The chuck arms 271 and 272 slide up the slopes of the guide blocks 510. The chuck arms 271 and 272 slide in both the sliding directions (lateral directions) of the front sliders 261 and 262 and a direction substantially perpendicular to the lateral directions (longitudinal direction); that is, the chuck arms 271 and 272 move so as to push the C ring 130 gradually toward the pivot 132.

As shown in FIG. 6(c), the cam followers 231 and 232 are disengaged from the inner eccentric cam 411 and are engaged with the outer eccentric cam 412. At this stage, the slider springs 300 and 310 stronger than the cam follower spring 290 start being stretched. As the motor 420 rotates further, the weak cam follower spring 290 is stretched to a necessary and sufficient extent and the resilience of the cam follower spring 290 acts through the sliders 241, 242, 251 and 252 on the chuck arms 271 and 272. Consequently, sufficient force for fastening the C ring 130 can be obtained.

FIG. 7(c) shows the C ring 130 in this state in a typical view. As shown in FIG. 7(c), the distance between the chuck arms 271 and 272 is shorter than that in the state shown in FIG. 7(b). The C ring 130 is pushed forward when the C ring 130 is attached to the pivot 132. As the chuck arms 271 and 272 slide in an inclined position, the expanded C ring 130 contracts by its own resilience and the gap 141 narrows. The resilience of the C ring 130 decreases to zero when the C ring 130 fastens on the pivot 132.

Figure 8:
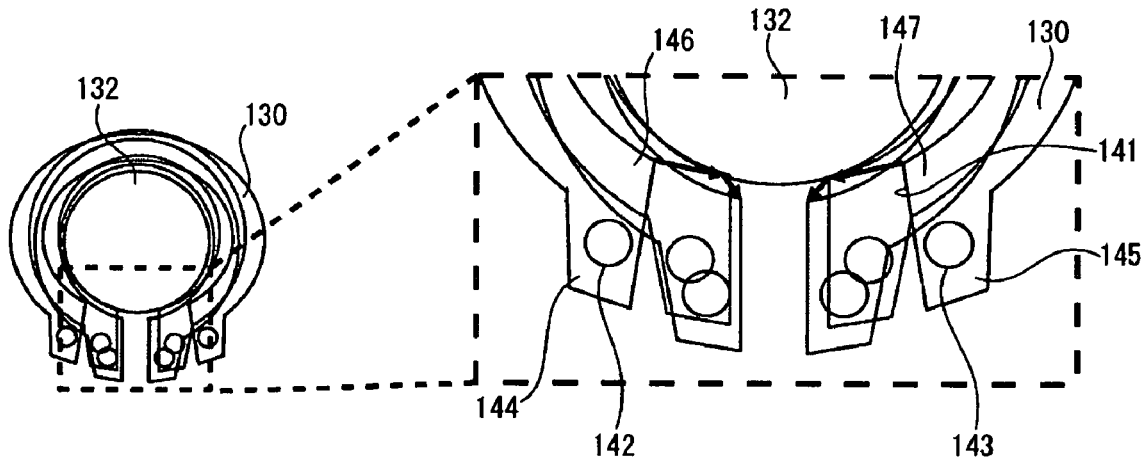
FIG. 8 is a schematic, typical view of assistance in explaining the C ring attaching operation to be carried out by the C ring attaching device according to an embodiment of the present invention.

FIG. 8 shows the fastening process of the C ring 130 shown in FIGS. 7(b) and 7(c) in an enlarged typical view. The contraction of the C ring 130 from a state shown in FIG. 7(b) to a state shown in FIG. 7(c) is indicated by the arrows. As shown in FIG. 8, the chuck arms 271 and 272 slide in oblique directions. Consequently, the C ring 130 fastens on the pivot 132 without the edges 146 and 147 of the C ring 130 touching the pivot 132 because the chuck arms 271 and 272 push the C ring 130 forward before the edges 146 and 147 come into contact with the pivot 132. The chuck arms 271 and 272 move such that the edges 146 and 147 of the C ring 130 do not touch the pivot 132 before the C ring 130 fully contracts. The inclined surface 511 of the guide block 510 is designed so that the edges 146 and 147 of the C ring 130 may not touch the pivot 132.

Thus the C ring 130 can be automatically attached to the pivot 132 by the C ring attaching device 110 of the present embodiment. Consequently, a hard disk drive can be efficiently assembled by the assembling apparatus 100 of the present embodiment.

The chuck arms 271 and 272 of the C ring attaching device 110 achieve simultaneously the operation for contracting the C ring 130 and the operation for pushing the C ring 130 forward. Consequently, scratching the pivot 132 with the edges 146 and 147 of the C ring 130 can be avoided and the production of metal powder by scraping the pivot 132 with the edges 146 and 147 of the C ring can be prevented, which is a greatly advantageous effect on assembling a hard disk drive to which existence of metal powder is extremely detrimental. Since the pivot 132 is scarcely damaged, the C ring 130 can properly contract.

If an additional actuator, such as a cylinder actuator, is used for pulling the chuck arms 271 and 272, the design of the C ring attaching device 110 needs to be changed to add wiring and piping to the C ring attaching device 110. The design of the C ring attaching device 110 does not need to be changed greatly in incorporating the arm guide mechanism 500 into the C ring attaching device 110. Thus, the chuck arms 271 and 272 can be moved forward by the low-cost mechanism and hence increase of the cost of the C ring attaching device 110 can be avoided.

Second Embodiment

A C ring attaching device 110 in a second embodiment according to the present invention is not provided with any members corresponding to the guide block 510 and the arm cam 520 of the C ring attaching device 110 in the first embodiment. The description of the general construction of the C ring attaching device 110 in the second embodiment will be omitted.

Figure 9:
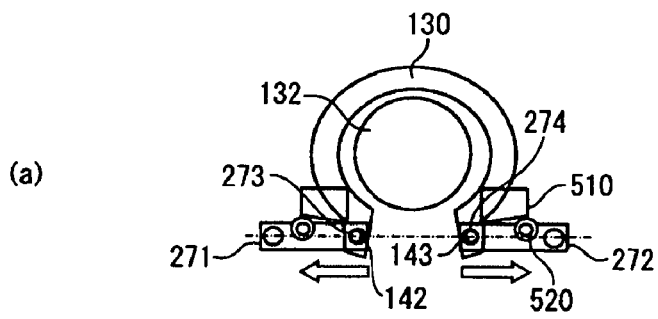
FIG. 9 is a schematic typical view of assistance in explaining another C ring attaching operation to be carried out by the C ring attaching device according to a second embodiment of the present invention.
Figure 9:
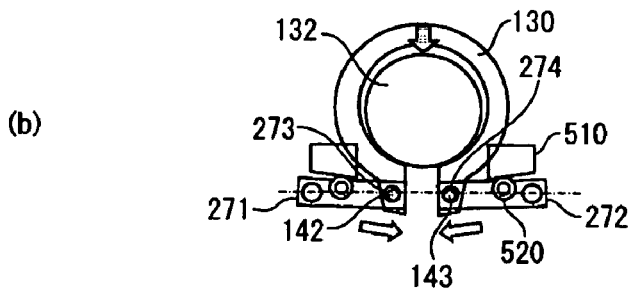
Figure 9:
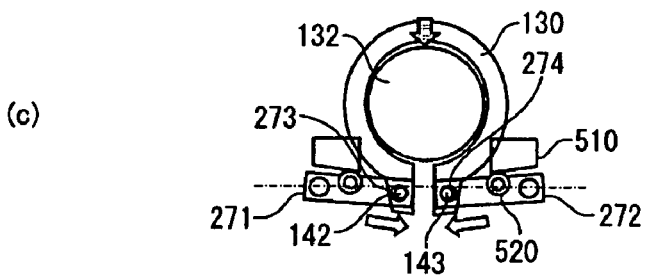

FIG. 9 is a typical view of assistance in explaining a C ring attaching operation to be carried out by the C ring attaching device 110 in the second embodiment to attach a C ring 130 on a pivot 132. As shown in FIG. 9(a), the C ring 130 is expanded so as to expand the gap 141 (see FIG. 10) thereof and is placed so as to surround the pivot 132. This state is substantially the same as the state shown in FIG. 7(a).

Then, the C ring 130 is allowed to contract as shown in FIG. 9(b). Chuck arms 271 and 272 move laterally toward each other to close the gap 141 of the C ring 130. In this state, the chuck arms 271 and 272 are spaced a distance A apart from each other. As the chuck arms 271 and 273 move laterally, the edges 146 and 147 of the C ring 130 approach the pivot 132.

FIG. 9(c) shows a C ring fastening process of completing fastening the C ring 130 in a state shown in FIG. 9(b). As shown in FIG. 9(c), the chuck arms 271 and 272 turn relative to front sliders 261 and 262 to push the C ring 130 forward to permit the C ring 130 contract further. The width of the gap 141 decreases from A to A−α The C ring 130 contracts by its own resilience to close the gap 141 and fastens on the pivot 132.

Figure 10:
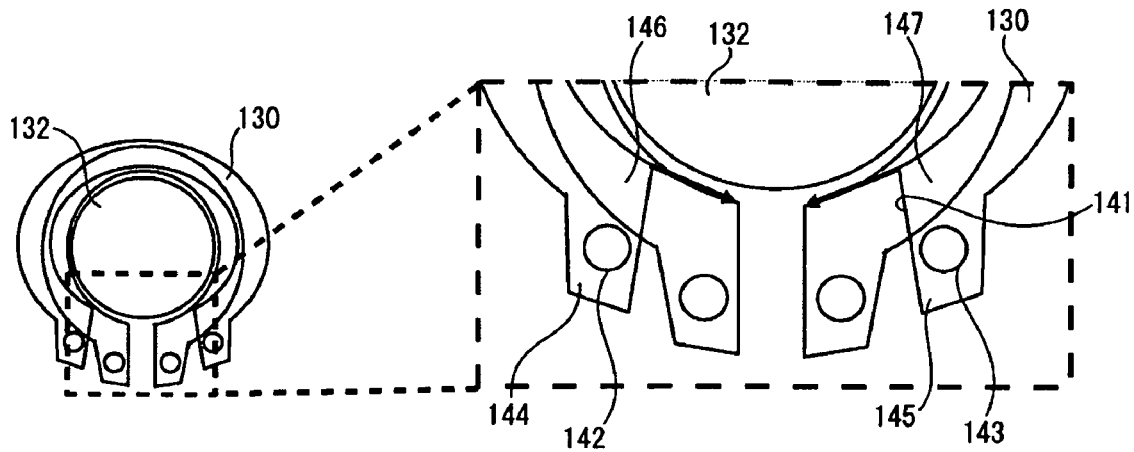
FIG. 10 is a schematic typical view of assistance in explaining another C ring attaching operation to be carried out by the C ring attaching device according to an embodiment of the present invention.

The fastening operation of the C ring 130 explained in connection with FIG. 9 is illustrated in FIG. 10 in an enlarged typical view. Movement of the C ring 130 during a fastening process from a state shown in FIG. 9(a) to a state shown in FIG. 9(c) is indicated by the arrows. As shown in FIG. 10, the C ring 130 approaches the pivot 132 once, and then separates from the pivot 132 and fastens to the pivot 132.

Thus the C ring can be automatically attached to the pivot 132 by the C ring attaching device 110 in the second embodiment. Since the chuck arms 271 and 272 of the C ring attaching device 110 are turnable, and hence the chuck arms 271 and 272 are able to move longitudinally as well as laterally. The chuck arms 271 and 272 can move the C ring 130 forward by the lateral and longitudinal movement. Even if the C ring 130 touches the pivot 132, the C ring 130 can be pulled toward the pivot 132 and can fully contract.

Third Embodiment

A C ring attaching device 600 in a third embodiment according to the present invention is similar to the C ring attaching device 110 in the second embodiment, except that the former is provided with chuck arms 271 and 272 fastened to front sliders 261 and 262.

Figure 11:
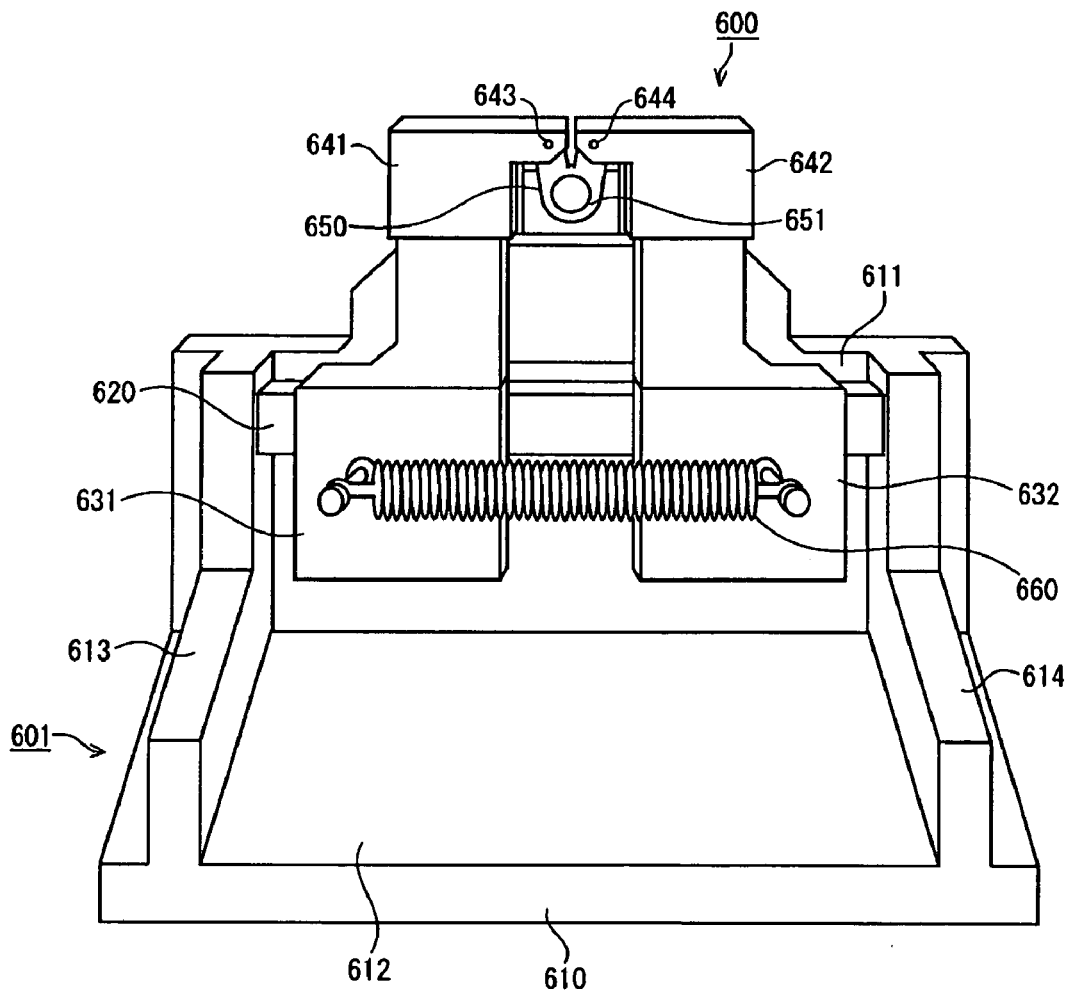
FIG. 11 is a perspective view of a C ring attaching device in a third embodiment according to the present invention.

The general construction of the C ring attaching device 600 in the third embodiment will be described with reference to FIG. 11. A pick-up mechanism 601 for picking up a C ring 130 included in the C ring attaching device 600 is shown in a bottom view in FIG. 11. FIG. 11, similarly to FIG. 3, is a view taken from below the C ring attaching device 600.

As shown in FIG. 11, the C ring attaching device 600 is provided with a pick-up mechanism 601. The pick-up mechanism 601 includes a base plate 610, a slide rail 620, sliders 631 and 632, chuck arms 641 and 642, a C ring guide 650 and a slider spring 660. The base plate 610, similarly to the base plate 210 of the C ring attaching device 110, has an upper wall 611, a back wall 612, and side walls 613 and 614. The slide rail 620, similarly to the back slide rail 220 of the C ring attaching device 110, is an elongate member having the shape of a strip. The slide rail 620 is fixed to the back wall 212 so as to extend parallel to the upper wall 611. The sliders 631 and 632 are mounted on the slide rail 620 so as to slide parallel to the back wall 612 along the slide rail 620. The sliders 631 and 632 are symmetric with respect to a centerline.

The chuck arms 641 and 642 are fixed to the sliders 631 and 632, respectively. The chuck arms 641 and 642 extend laterally opposite to each other. Chuck pins 643 and 644 similar to the chuck pins 273 and 274 are attached near the free ends of the chuck arms 641 and 642, respectively.

The C ring guide 650, similarly to the C ring guide 280, positions the C ring 130. The C ring guide 650 is provided with a C-shaped groove 651 resembling the shape of the C ring 130. The C ring guide 650 is fixed to the upper wall 611 of the base plate 610 at a position between the chuck arms 641 and 642.

The slider spring 660 is extended between the sliders 631 and 632 so as to pull the sliders 631 and 632 toward each other. The slider spring 660 is designed such that the sliders 631 and 632 are able to move symmetrically.

The C ring attaching device 600 is provided on the upper wall 611 of the base plate 610 with a driving mechanism, not shown in FIG. 11, similar to the driving mechanism of the C ring attaching device 110. The driving mechanism includes an eccentric cam, not shown, and a motor, not shown. The sliders 631 and 632 are interlocked with the eccentric cam of the driving mechanism. The motor drives the eccentric cam for rotation to slide the sliders 631 and 632 along the slide rail 620 toward and away from each other. The chuck arms 641 and 642 move toward and away from each other as the sliders 631 and 632 move toward and away from each other.

A C ring attaching operation of the C ring attaching device 600 will be described with reference to FIGS. 12 and 13. The C ring attaching operation will be described principally in connection with FIG. 12 and reference will be made to FIG. 13 when necessary.

Figure 12:
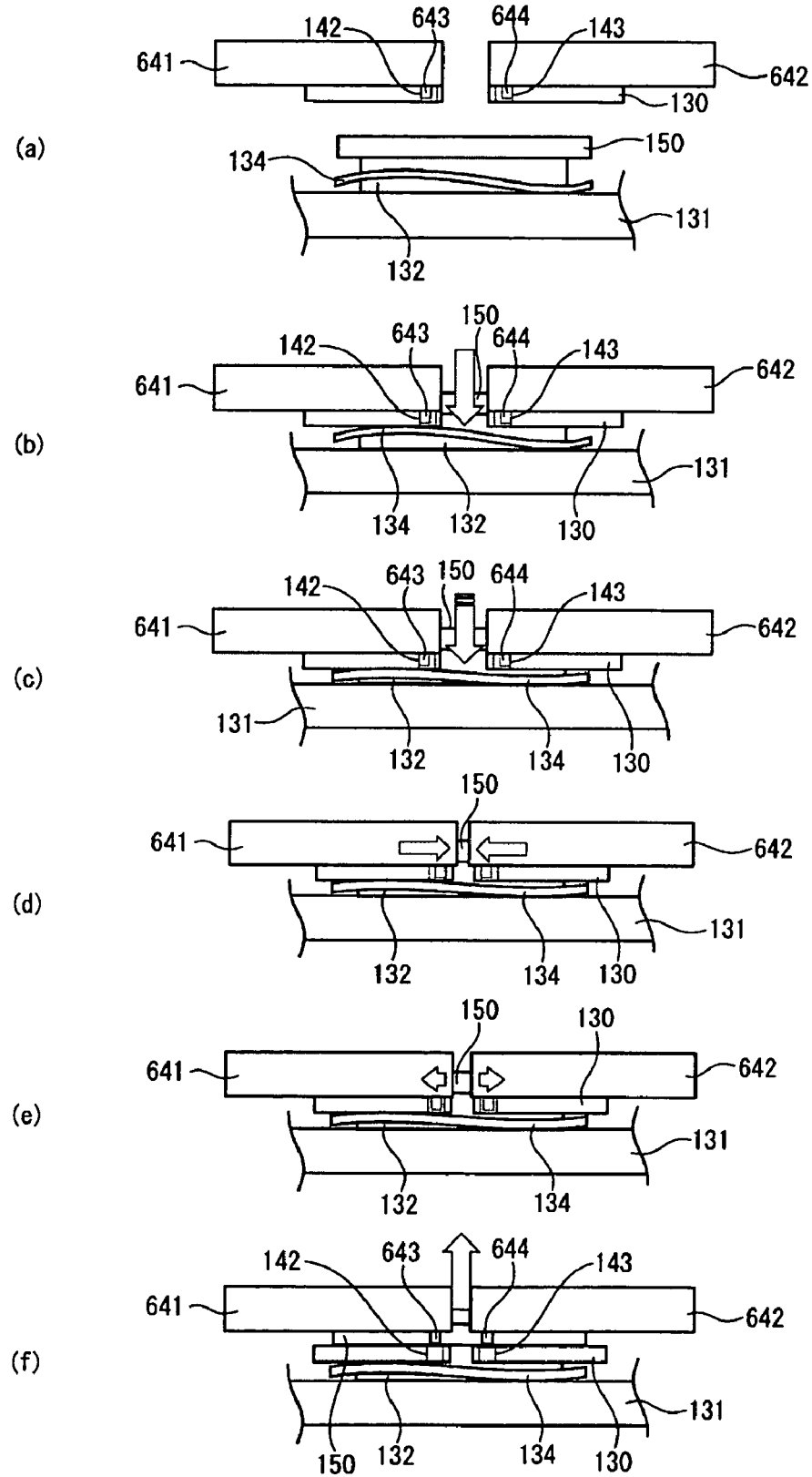
FIG. 12 is a schematic, typical view of assistance in explaining a C ring attaching operation to be carried out by the C ring attaching device according to an embodiment of the present invention.
Figure 13:
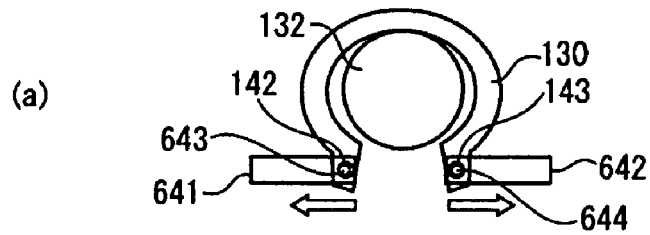
FIG. 13 is a schematic, typical view of assistance in explaining another C ring attaching operation to be carried out by the C ring attaching device according to an embodiment of the present invention.
Figure 13:
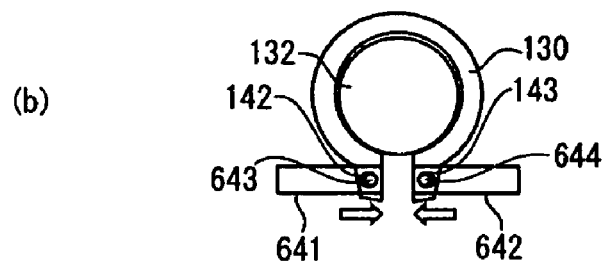

FIG. 12 illustrates the general operation of the C ring attaching device 600. As shown in FIG. 12(a), a HSA 131 and a wavy washer 134 are attached to a pivot 132. The chuck pins 643 and 644 of the chuck arms 641 and 642 are inserted in the chuck holes 142 and 142 of the C ring 130, and the chuck arms 641 and 642 are moved away from each other to expand a gap 141 in the C ring 130. The chuck arms 641 and 642 position the C ring 130 directly above the pivot 132.

As shown in FIG. 12(b), the chuck arms 641 and 642 put the C ring 130 on the wavy washer 134 previously put on the HSA 131 mounted on the pivot 132. FIG. 13(a) shows the C ring 130 put on the wavy washer 134. This state is similar to the state of the C rings 130 shown in FIGS. 7(a) and 9(a).

As shown in FIG. 12(c), the chuck arms 641 and 642 depress the wavy washer 134 to attach the C ring 130 to the pivot 132. As shown in FIG. 12(d), the C ring 130 contracts by its own resilience. The contracted C ring 130 is pushed upward by the wavy washer 134 and is held between the wavy washer 134 and a flange 150 formed on the pivot 132. FIG. 13(b) shows the contracted C ring 130. As shown in FIG. 13(b), the C ring 130 contracts as the chuck arms 641 and 642 slide laterally toward each other.

As shown in FIG. 12(e), the gap 141 of the C ring 130 is expanded slightly to extract the chuck pins 643 and 644 of the chuck arms 641 and 642 from the chuck holes 142 and 143. Consequently, the chuck pins 643 and 644 are separated from the side surfaces of the chuck holes 142 and 143 and can be extracted from the chuck holes 142 and 143. As shown in FIG. 12(f), the chuck arms 641 and 642 are raised and are returned to their predetermined home positions in the C ring attaching device 600.

The C ring 130 can be automatically attached to the pivot 132 by using the C ring attaching device 600 in the third embodiment. The C ring 130 contracts by its own resilience and fastens on the pivot 132 after the C ring 130 has been placed under the flange 150 of the pivot 132 by the C ring attaching device 600. Thus the C ring attaching device 600 has only a simple opening and closing function. Therefore, in some cases, the pressure of the wavy washer 134 applied to the C ring 130 restrains the C ring from being freely moved and, consequently, it is possible that the following problem arises.

There is the possibility that the C ring 130 is unable to contract completely. The C ring 130 is put in place under the flange 150 of the pivot 132 and is allowed to contract resiliently so as to fasten on the pivot 132. When the C ring 130 is put in place, the wavy washer 134 is compressed to some extent and applies a pressure to the C ring 130. Consequently, friction acting between the C ring 130 and the wavy washer 134 increases and the C ring 130 is unable to contract against the high friction. The slider spring 600 may be replaced with another stronger slider spring to contract the C ring 130 against a high friction caused by the pressure of the wavy washer 134.

There is the possibility that an assembly 133 built by assembling the HSA 131, the wavy washer 134, the pivot 132 and the C ring 130 is lifted up together with the chuck pins 643 and 644 when the chuck arms 641 and 642 are raised. Even if the C ring 130 is unable to contract completely, there is no functional problem provided that the C ring 130 is put in place in an annular groove under the flange 150 of the pivot 132. Thus the C ring 130 does not need necessarily to contract completely. In the C ring attaching device 600, the chuck arms 641 and 624 keep exerting force on the C ring 130 so as to make the C ring 130 contract completely. Consequently, the assembly 133 is held between the chuck pins 643 and 644 inserted in the chuck holes 142 and 143 of the C ring 130 and is raised by the C ring attaching device 600. It is possible that the weight of the assembly 133 exceeds the force holding the assembly 133 on the C ring attaching device 600 and the assembly 133 drops. Consequently, shocks that act on the assembly 133 when the assembly 133 drops cause dimple separation.

When the C ring 130 is attached to the pivot 132 automatically by the C ring attaching device 600, the chuck pins 643 and 644, similarly to those of the C ring attaching devices disclosed in Patent documents 1 and 2, move straight. In such a case, the C ring 130 is expanded once by an external force and contracts resiliently in a groove formed in a workpiece (pivot 132), so that the C ring 130 is able to fasten on the pivot 132.

When a force is applied perpendicularly to the C ring and a high frictional force acts on the C ring 130 as mentioned above, the C ring 130 is unable to contract freely and completely. Although it is desired to apply a force mechanically to make the C ring 130 contract, the C ring 130 is very small as compared with a device capable of exerting a mechanical force necessary to make the C ring 130 contract on the C ring 130. Therefore, a device capable of exerting a high force on the C ring 130 cannot be used and the C ring attaching device cannot be freely designed.

When the C ring attaching apparatus 600 in the third embodiment or the known C ring attaching device disclosed in Patent document 1 or 2 is used, it is highly possible that metal powder is produced due to friction between the C ring 130 and the pivot 132 and the assembly 133 and a hard disk drive including the assembly 133 are contaminated with the metal powder. Such a possibility is a serious problem to a hard disk drive to which contamination with metal powder is extremely detrimental.

Accordingly, the C ring attaching devices 110 in the first embodiment and the second embodiment that turn the chuck pins 273 and 274 is preferable to the C ring attaching device 600 in the third embodiment that moves the chuck pins 643 and 644 straight.

Fourth Embodiment

A C ring attaching device 600 in a fourth embodiment according to the present invention is developed by incorporating improvements relating to operations to be carried out after a C ring 130 has been put in place into the C ring attaching device 600 in the third embodiment.

Figure 14:
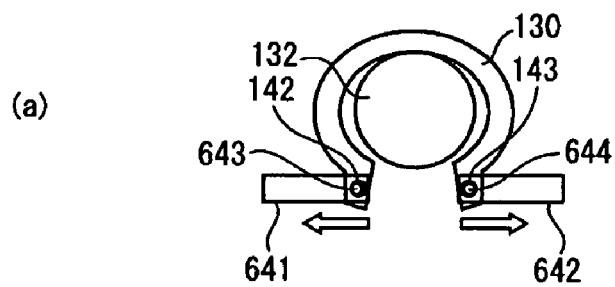
FIG. 14 is a schematic, typical view of assistance in explaining another C ring attaching operation to be carried out by the C ring attaching device according to a fourth embodiment of the present invention.
Figure 14:
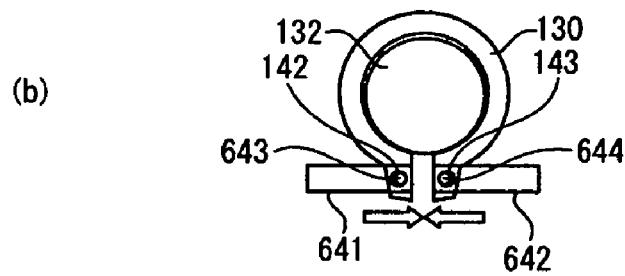
Figure 14:
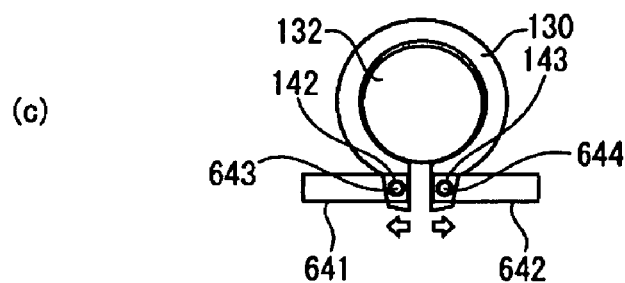

FIG. 14 typically illustrates additional operations of the C ring attaching device 600. As shown in FIGS. 14(a) and 14(b), chuck arms 641 and 642 expand a C ring 130 and put the expanded C ring 130 on a pivot 132. As shown in FIG. 14(c), the chuck arms 641 and 642 are moved again so as to expand the C ring 130 after the C ring 130 has contracted. Consequently, chuck pins 643 and 644 are separated from the side surfaces of the chuck holes 142 and 143 of the C ring 130 to release the C ring 130. Subsequently, the chuck arms 641 and 642 are separated from the C ring 130 and are returned to their home positions.

Thus the chuck arms 641 and 642 are moved again so as to release the C ring 130 after the C rings 130 have contracted. Since tension acting on the chuck arms 641 and 642 is thus removed, the C ring 130 is able to contract still further.

Fifth Embodiment

A C ring attaching device 600 in the fifth embodiment according to the present invention is developed by incorporating improvements relating to operations to be carried out after a C ring 130 has been put in place into the C ring attaching device 600 in the third embodiment. The C ring attaching operation of the C ring attaching device 600 in the fifth embodiment will be described with reference to FIG. 15. Reference will be made to FIG. 12 when necessary.

Figure 15:
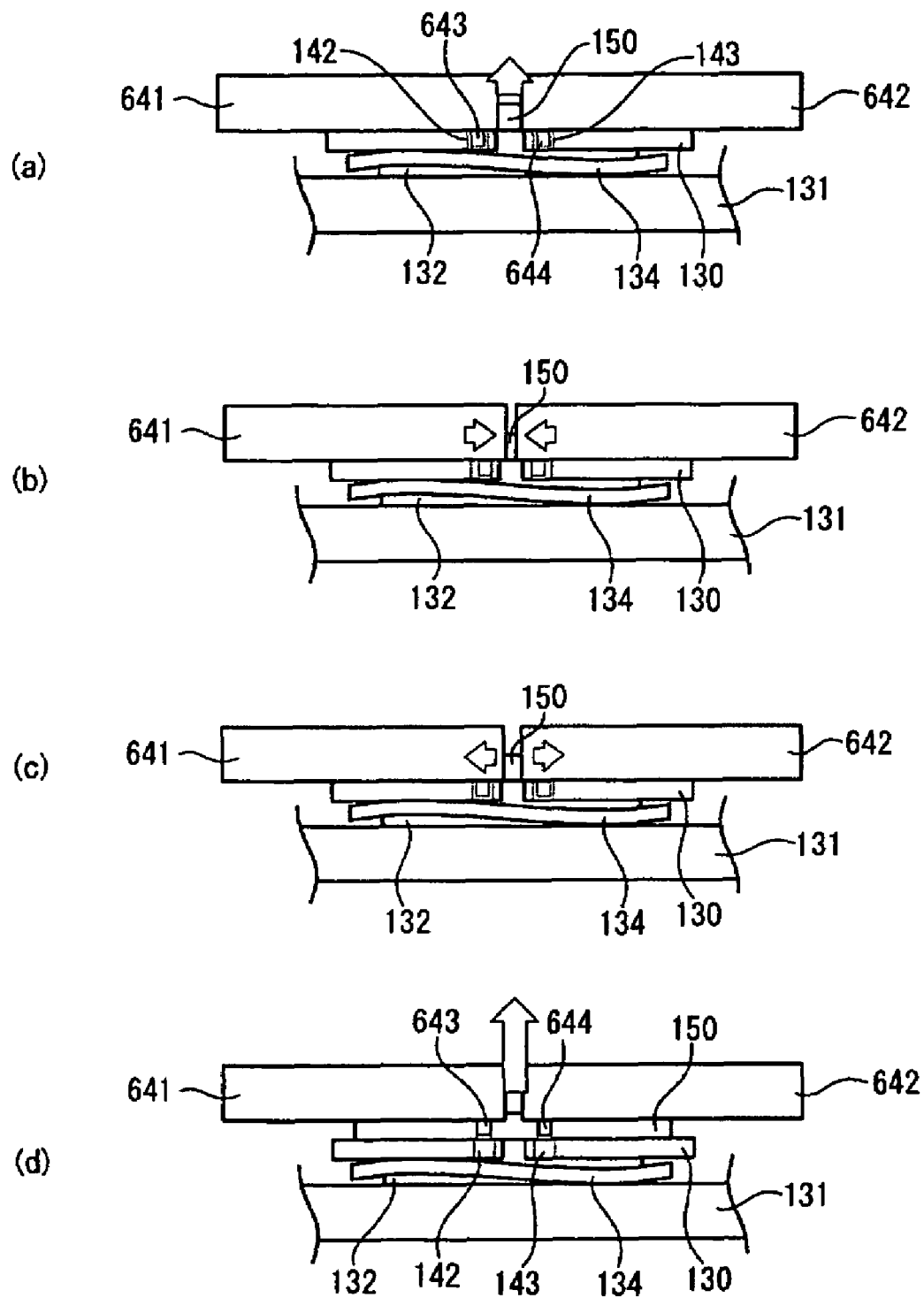
FIG. 15 is a schematic, typical view of assistance in explaining another C ring attaching operation to be carried out by the C ring attaching device according to a fifth embodiment of the present invention.

FIG. 15 illustrates additional operations to be performed by the C ring attaching device 600. As shown in FIGS. 12(a) to 12(e), chuck arms 641 and 642 are moved to make a C ring 130 contract. In this state, the C ring 130 is placed below the flange 150 of a pivot 132 at a sufficient distance from the flange 150. Then, as shown in FIG. 15(a), the chuck arms 641 and 642 are moved to expand the C ring 130 again and to lift up the C ring 130 slightly by a distance shorter than that shown in FIG. 12(f).

As shown in FIG. 15(b), the chuck arms 641 and 642 are moved to make the C ring 130 contract again after lifting up the C ring 130. Then, as shown in FIGS. 15(c) and 15(d), chuck pins 643 and 644 attached to the chuck arms 641 and 642 are separated from the C ring 130 and are returned to their home positions. Operations illustrated by FIGS. 15(c) and 15(d) are the same as releasing operations for releasing the C ring 130 illustrated by FIGS. 12(e) and 12(f).

Thus the chuck arms 641 and 642 are operated to make the C ring 130 contract in two steps. The C ring 130 is able to contract properly in two steps and to fasten on the pivot 132 even if the wavy washer 134 compressed to some extent applies pressure upward on the C ring 130.

Sixth Embodiment

Figure 16:
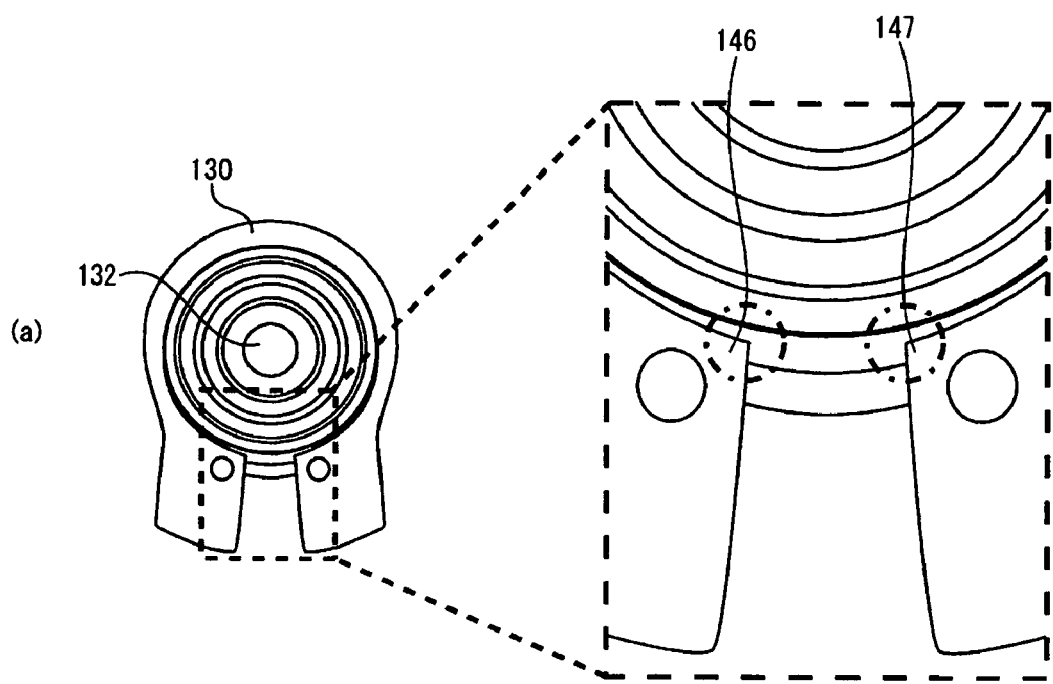
FIG. 16 is a plan view of a C ring relating to a sixth embodiment of the present invention.
Figure 16:
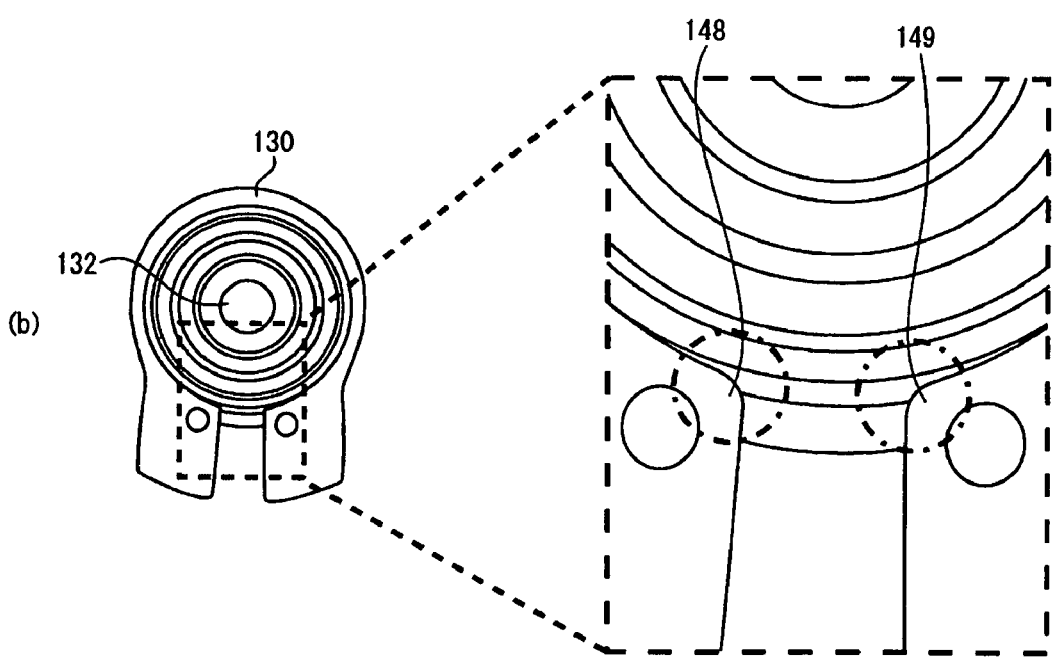

Various types of C rings 130 to be attached by the C ring attaching devices in the first to the fifth embodiment will be described. FIG. 16 shows C rings 130 by way of example in a plan view. As shown in FIG. 16(a), the inner circumference of a C ring 130 is terminated by a gap 141, and edges 146 and 147 enclosed by broken circles in FIG. 16(a) are formed at the opposite ends of the inner circumference of the C ring 130. The edges 146 and 147 shown in FIG. 16(a) have square corners.

Edges 148 and 149 of the inner circumference of a C ring 130 shown in FIG. 16(b) have round corners formed by rounding square edges 146 and 147. The round edges 148 and 149 do not scratch a pivot 132 easily when the C ring 130 is attached to the pivot 132.

EXAMPLE 1

C rings 130 were attached to pivots 132 by the C ring attaching devices 110 in the first embodiment and the second embodiment and the C ring attaching device 600 in the third embodiment. The respective C ring attaching performances of the C ring attaching devices 110 and 600 were comparatively evaluated in terms of fastening condition, lifting and flaws formed in the pivots 132.

The fastening condition of the C ring 130 was evaluated on the basis of the distance D between the chuck holes 142 and 143. Shorter distance D indicates better fastening condition. An excessively long distance D indicates that the C ring 130 has not properly fastened on the pivot 132. When the C ring 130 is put on the pivot 132 without the wavy washer 134, the distance D is on the order of 5.6 mm.

Lifting of the C ring 130 due to the pressure applied to the C ring 130 by the wavy washer 134 is not a regular occurrence but an accidental occurrence. Some assemblies were formed and the lifting was determined on the basis of the frequency of lifting. Since lifting itself cannot be detected by a machine, a ratio of dimple separation resulting from lifting was used for the evaluation of lifting. C rings 130 attached to the pivots 132 by the C ring attaching devices 110 and 600 were removed carefully with a pair of hand pliers, and the annular grooves of the pivots 132 were observed under a microscope to measure the depth and length of flaws.

Figure 17:
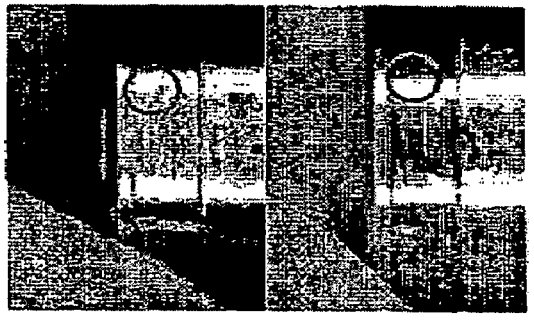
FIG. 17 is a table showing the results of evaluation of the C ring attaching operation carried out by the C ring attaching devices according to embodiments of the present invention.
Figure 17:
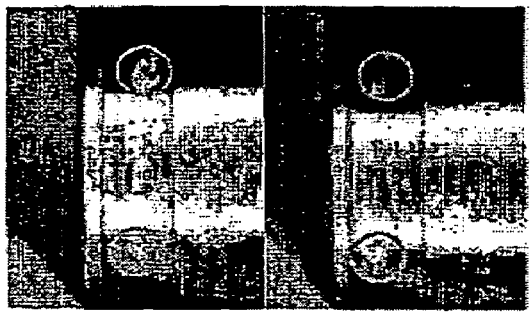
Figure 17:
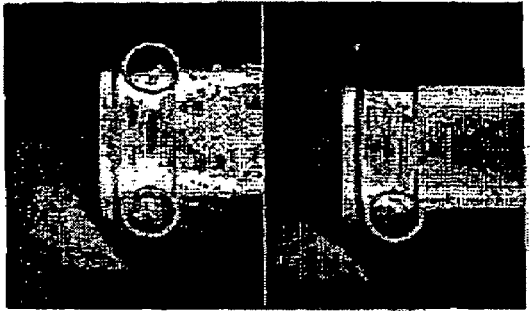
Figure 18:
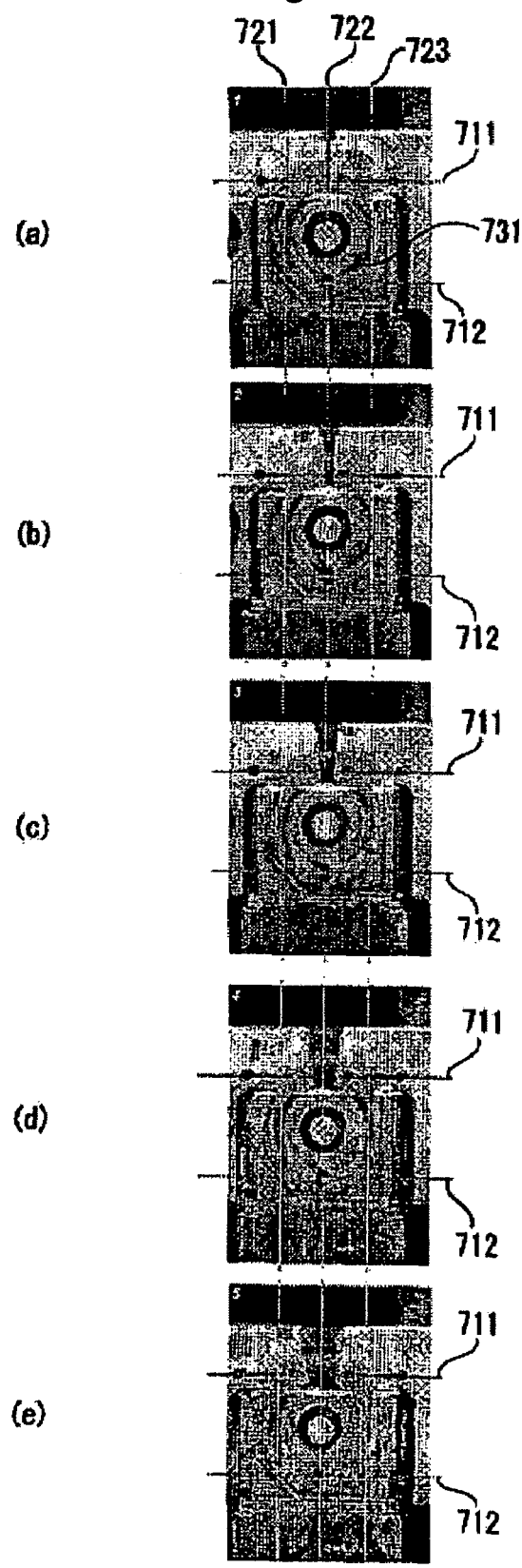
FIG. 18 is a strip film carrying photographs of a C ring in a C ring attaching process carried out by the C ring attaching device according to embodiments of the present invention.
Figure 19:
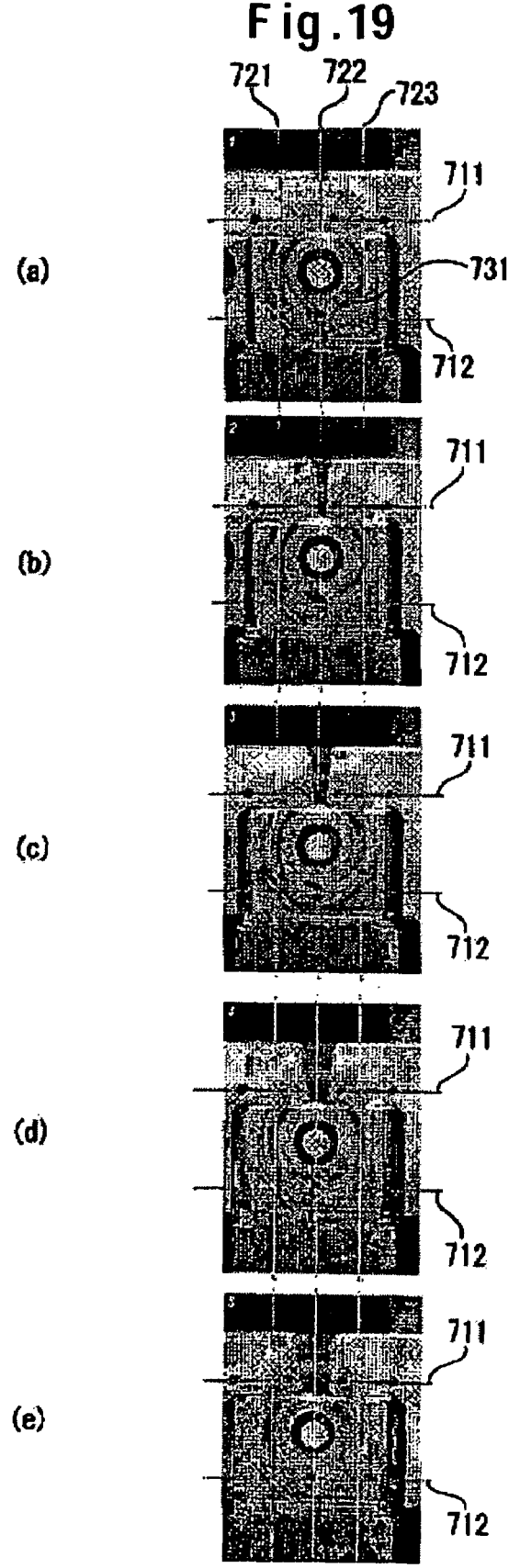
FIG. 19 is a strip film carrying photographs of a C ring in a C ring attaching process carried out by the C ring attaching device according to embodiments of the present invention.
Figure 20:
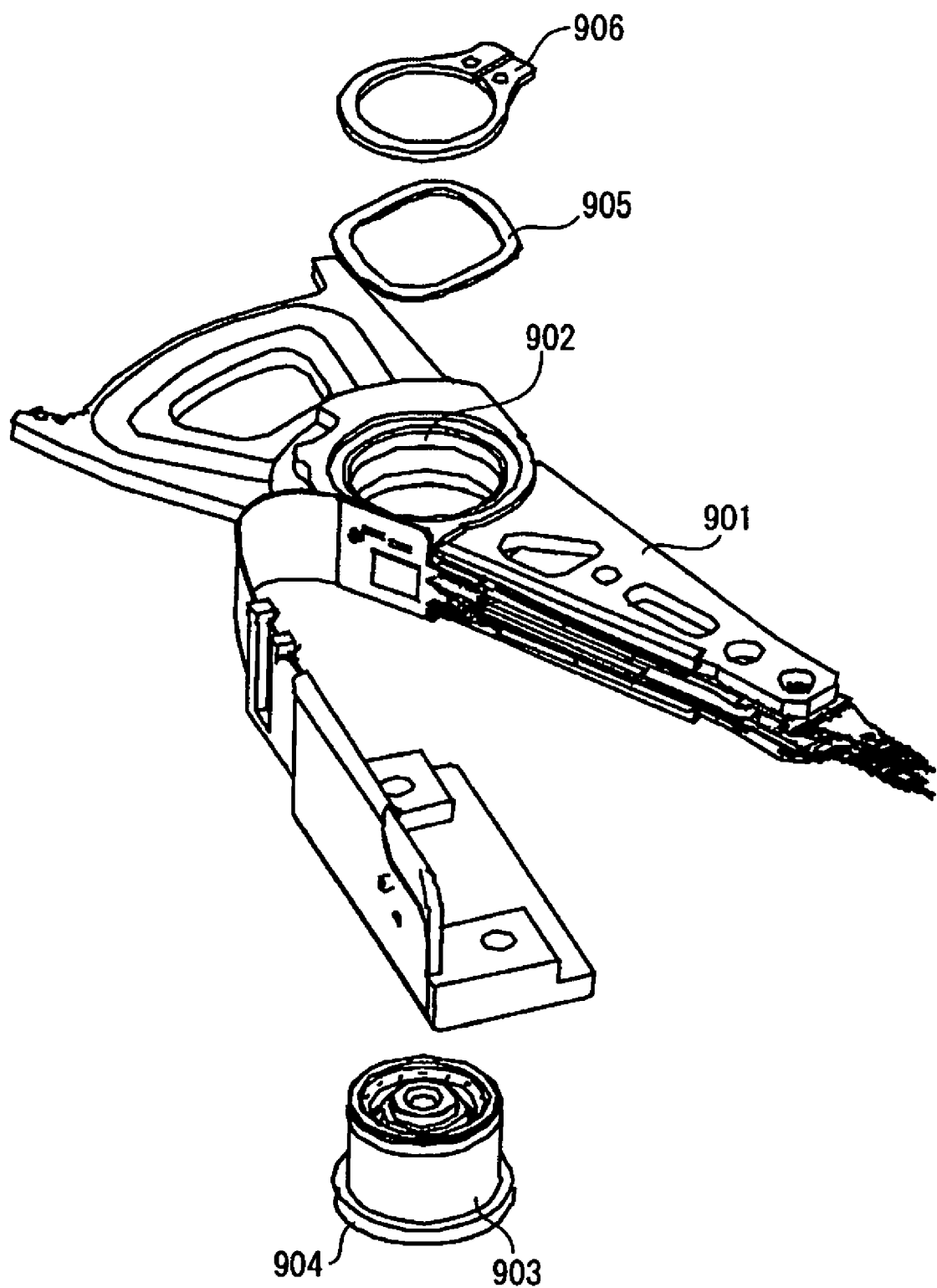
FIG. 20 is a perspective view of a HSA and a pivot in a conventional hard disk drive.

FIG. 17 shows the results of comparative evaluations. FIGS. 18 and 19 are strip films carrying photographs of a C ring in a C ring expanding process carried out by the C ring attaching device 600 in the third embodiment. Horizontal lines 711 and 712, vertical lines 721, 722 and 723, and circles 731 and 732 are drawn in those photographs. The upper horizontal line 711 represents the path of the chuck pins, the lower horizontal lines 712 is tangent to the bottom point of the inner edge of the C ring 130 in a state where the C ring 130 was not expanded in FIGS. 17 and 18. The vertical lines 721, 722 and 723 are a line tangent to the left end of the inner edge of the C ring 130, a line corresponding to a center pin holding the pivot 132, and a line tangent to the right end of the inner edge of the C ring 130, respectively. The circles 731 and 732 correspond to the inner edge of the C ring 130 before expansion and after expansion, respectively.

The C ring attaching devices 110 in the first embodiment and the second embodiment will be examined with reference to FIGS. 18 and 19. The use of the guide block 510 improved the fastening condition of the C ring 130 and reduced flaws in the pivot 132.

As obvious from FIGS. 18 and 19, the inner edge of the C ring 130 is deformed uniformly when the C ring 130 is expanded. The expanded C ring 130 contracts, reversing the sequential conditions shown in the photographs on the strip films shown in FIGS. 18 and 19; that is, the inside diameter of the C ring decreases gradually.

The C ring 130 expands and contracts in the foregoing mode under no load thereon. The C ring 130 does not necessarily expand and contract in the foregoing mode under the pressure applied thereto by the wavy washer 134. More concretely, an end part of the C ring 130 on the side of the gap 141 is held by the chuck pins 273 and 274 of the chuck arms 271 and 272, and is moved forcibly by the chuck arms 271 and 272 under the pressure applied thereto by the wavy washer 134.

A top part of the C ring 130 on the side opposite the gap 141 (a lower part of the C ring 130 in FIGS. 18 and 19) is unable to restore its original shape unless a force is exerted on the C ring 130 to assist the C ring 130 to contract. Therefore, the gap 141 is fixed at a position and the C ring 130 contracts incompletely. The guide block 510 exerts a force on the C ring 130 to pull the C ring 130 toward the pivot 132. Consequently, the C ring 130 is able to contract completely without flawing the pivot 132.

The C ring attaching device 110 provided with the guide block 510 and capable of thus making the C ring expand and contract prevents dimple separation due to the lifting of the C ring and reduces flaws in the pivot. The C ring 130 is often unable to contract completely when an external force, such as a frictional force, acts thereon. When the C ring 130 is put on the pivot 132 in a state where an external force, such as a frictional force, is exerted on the C ring 130, the top part of the C ring 130 on the side opposite the gap 141 is pulled toward the pivot 132. The C ring 130 is able to contract completely when the inner edge of the C ring 130 is brought into contact with the pivot 132.

The C ring attaching devices 600 in the second embodiment and the third embodiment will be examined with reference to FIGS. 18 and 19. The size D of the C ring attaching devices 600 in the second embodiment and the third embodiment was 6.4 mm or above because the edges 146 and 147 of the C ring 130 bit into the surface of the pivot 132.

Flaws formed by the C ring attaching device 600 in the second embodiment are larger than those formed by the C ring attaching device 600 in the third embodiment and the flaws start from the outer side. In the C ring attaching device 600 in the second embodiment, the chuck arms 641 and 642 were able to turn and it is considered that the chuck arms 641 and 642 were pulled slightly toward the C ring 130 when the C ring 130 was expanded; that is, the chuck arms 641 and 642 were pulled toward the pivot 132 beyond the blue line shown in FIGS. 17 and 18. It is considered that the center of the C ring 130 was dislocated from the center of the pivot 132, and, consequently, flaws were formed from the outer side in the pivot 132.

It is considered that the size D in the C ring attaching device 600 in the third embodiment increases when the center of the C ring 130 is dislocated from the center of the pivot 132. The chuck arms 641 and 642 of the C ring attaching device 600 in the second embodiment are turnable. Therefore, it is inferred that the C ring 130 did not stop upon contact with the pivot 132 and the chuck arms 641 and 642 could move along the surface of the pivot 132 and, consequently, deep scratches were formed in the pivot 132.

When the guide block 510 included in the C ring attaching device 110 in the first embodiment is added to the C ring attaching devices in the second embodiment and the third embodiment, the chuck arms 271 and 272 are restrained from turning toward the C ring 130 beyond the guide block 510. Thus, it is considered that the C ring attaching device in the first embodiment could thus improve the condition of flaws.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A retaining ring attaching device for attaching a retaining ring having an opening to a shaft, comprising:
   chucking arms configured to expand the retaining ring, put the retaining ring on the shaft and contract the retaining ring;
   a chucking arm moving mechanism configured to move the chuck arms holding the retaining ring so as to move the retaining ring in a first direction in which a gap in the retaining ring moves away from the shaft while the retaining ring is contracting on the shaft,
   wherein the chucking arm moving mechanism includes:
      sliders capable of sliding in a second direction in which the retaining ring expands; and
      a guide mechanism capable of sliding the chucking arms in a third direction inclined to the second direction toward the first direction so that the chucking arms move toward each other, pushing the retaining ring in the first direction;
   a motor having a rotating shaft;
   an eccentric cam having an inner eccentric cam and an outer eccentric cam, and fixedly mounted on the rotating shaft of the motor; and
   cam followers connected to the sliders so as to move along the inner eccentric cam or the outer eccentric cam to slide the sliders.

2. The retaining ring attaching device according to claim 1 further comprising slider springs movably connecting the sliders and the cam followers.

3. The retaining ring attaching device according to claim 1, wherein the guide mechanism has an arm cam fixed to the chuck arm, and a guide block having an inclined surface, and fixed to the slider with the inclined surface inclined in the third direction and in contact with the arm cam.

4. A retaining ring attaching device comprising:
   sliders capable of sliding in a direction in which a retaining ring having a gap expands;
   chucking arms fixed to the sliders, capable of sliding in the direction in which the retaining ring expands as the sliders slide and of putting the retaining ring on a shaft inserted in the retaining ring;
   a motor having a rotating shaft;
   an eccentric cam having an inner eccentric cam and an outer eccentric cam and fixedly mounted on the rotating shaft for rotation together with the rotating shaft; and
   cam followers connected to the sliders so as to move along the inner eccentric cam or the outer eccentric cam to slide the sliders.

5. The retaining ring attaching device according to claim 4, further comprising slider springs movably connecting the sliders and the cam followers.

6. A retaining ring attaching device comprising:
   first and second sliders disposed opposite to each other and capable of moving in opposite directions;
   a first chuck arm to be connected to a first end of a retaining ring having a gap, connected to the first slider, and capable of moving in the opposite directions as the first slider slides;
   a second chuck arm to be connected to a second end of the retaining ring opposite the first end, connected to the second slider, and capable of sliding in the opposite directions as the second slider slides to expand the retaining ring in cooperation with the first chuck arm so that the retaining ring is attached to a shaft; and
   a guide mechanism configured to guide the first and the second chuck arm for sliding in a direction inclined to the opposite directions toward an outward direction from the center of the retaining ring toward the gap of the retaining ring so that the first and the second chuck arm permit the retaining ring to contract by pressing the retaining ring in the outward direction;
   a motor having a rotating shaft;
   an eccentric cam having an inner eccentric cam and an outer eccentric cam and fixedly mounted on the rotating shaft;
   a first cam follower that moves along the inner or the outer eccentric cam to slide the first slider;
   a second cam follower that moves along the inner or the outer eccentric cam to slide the second slider in coordination with the first slider;
   a first slider spring movably connecting the first slider and the first cam follower;
   a second slider spring movably connecting the second slider and the second cam follower; and
   a cam follower spring having a spring constant lower than those of the first and the second slider spring and movably connecting the first and the second cam follower.

7. The retaining ring attaching device according to claim 6, wherein the guide mechanism includes:
   a first guide mechanism capable of coming into contact with the first chuck arm in an inclined plane inclined in the outward direction to the opposite directions to guide the first chuck arm along the inclined plane so that the retaining ring is pushed; and
   a second guide mechanism interlocked with the first chuck arm and capable of guiding the second chuck arm so as to push the retaining ring.

8. The retaining ring attaching device according to claim 7, wherein the second guide mechanism includes:
   an arm spring movably connecting the first chuck arm and the second chuck arm; and
   an arm cam fixed to the second chuck arm, and holding the first chuck arm together with the first guide mechanism to operate the second chuck arm substantially symmetrically with the first chuck arm with respect to an axis substantially perpendicular to a line connecting the first and the second end.

* * * * *